US012809057B2

(12) United States Patent
Fabick et al.

(10) Patent No.: US 12,809,057 B2
(45) Date of Patent: Nov. 24, 2026

(54) OPTICAL FILM AND PACKAGE

(71) Applicant: 3M INNOVATIVE PROPERTIES COMPANY, St. Paul, MN (US)

(72) Inventors: Ryan T. Fabick, Shoreview, MN (US); Matthew B. Johnson, Woodbury, MN (US); Kyle M. Nesheim, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 447 days.

(21) Appl. No.: 18/263,221

(22) PCT Filed: Jan. 25, 2022

(86) PCT No.: PCT/IB2022/050649
§ 371 (c)(1),
(2) Date: Jul. 27, 2023

(87) PCT Pub. No.: WO2022/172110
PCT Pub. Date: Aug. 18, 2022

(65) Prior Publication Data

US 2024/0125978 A1 Apr. 18, 2024

Related U.S. Application Data

(60) Provisional application No. 63/200,059, filed on Feb. 12, 2021.

(51) Int. Cl.
*G02B 1/04* (2006.01)
*G02B 5/28* (2006.01)

(52) U.S. Cl.
CPC .............. *G02B 1/04* (2013.01); *G02B 5/283* (2013.01); *G02B 5/287* (2013.01)

(58) Field of Classification Search
CPC .......... G02B 1/04; G02B 5/283; G02B 5/287; G02B 5/288; B32B 2307/30;
(Continued)

(56) References Cited

U.S. PATENT DOCUMENTS

2018/0321514 A1 11/2018 Carrega et al.

FOREIGN PATENT DOCUMENTS

JP 2016150033 A 8/2016
JP 6622464 B2 12/2019
(Continued)

OTHER PUBLICATIONS

English machine translation of JP6622464. (Year: 2019).*
International Search report for PCT International Application No. PCT/IB2022/050649, mailed on Apr. 28, 2022, 3 pages.

*Primary Examiner* — Michael C Miggins
(74) *Attorney, Agent, or Firm* — Clifton F. Richardson; Theresa Stadheim

(57) ABSTRACT

A package for protecting a light sensitive material is disclosed. The package includes an optical film including a plurality of polymeric layers. For a substantially normally incident light, an optical transmittance of the optical film versus wavelength includes a band edge separating a first wavelength range including at least wavelengths from about 360 nm to about 400 nm from a second wavelength range including at least wavelengths from about 520 nm to about 680 nm. The optical film has an average optical transmittance of less than about 15% in the first wavelength range and an average optical transmittance of greater than about 70% in the second wavelength range.

9 Claims, 15 Drawing Sheets

(58) Field of Classification Search
CPC .......... B32B 2307/40; B32B 2307/416; B32B 2307/7244; B32B 2307/7246; B32B 2307/732; B32B 7/022; B32B 7/023; B32B 27/08; B32B 27/306; B32B 27/308; B32B 27/36; B32B 27/365; B32B 2250/24; B32B 2439/40; B32B 7/12
See application file for complete search history.

(56) References Cited

FOREIGN PATENT DOCUMENTS

| | | | | |
|---|---|---|---|---|
| JP | 6789213 B2 | | 11/2020 | |
| KR | 10-2143882 B1 | | 8/2020 | |
| WO | WO-9936808 A1 | * | 7/1999 | .......... G02B 5/3083 |
| WO | 2020053832 A1 | | 3/2020 | |

* cited by examiner

502

OPTICAL FILM AND PACKAGE

CROSS REFERENCE TO RELATED APPLICATIONS

This application is a national stage filing under 35 U.S.C. 371 of PCT/IB2022/050649, filed Jan. 25, 2022, which claims the benefit of U.S. Application No. 63/200,059, filed Feb. 12, 2021, the disclosures of which are incorporated by reference in their entirety herein.

TECHNICAL FIELD

The present disclosure relates, in general, to a package. In particular, the present disclosure relates to an optical film and a package for protecting a light sensitive material disposed therein.

BACKGROUND

Packages including light sensitive materials can be exposed to light from various sources, for example, ambient light. Such light may include ultraviolet (UV) light. In some cases, the light sensitive materials may be degraded upon exposure to UV light. For example, one or more chemical properties of the light sensitive materials may be adversely affected when the light sensitive materials are exposed to UV light.

SUMMARY

In an aspect, the present disclosure provides a package for protecting a light sensitive material disposed therein. The package includes an optical film including a plurality of polymeric layers numbering at least 20 in total. Each of the polymeric layers has an average thickness of less than about 500 nanometers (nm). For a substantially normally incident light, an optical transmittance of the optical film versus wavelength includes a band edge separating a first wavelength range including at least wavelengths from about 360 nm to about 400 nm from a second wavelength range including at least wavelengths from about 520 nm to about 680 nm. For the substantially normally incident light, the optical film has an average optical transmittance of less than about 15% in the first wavelength range and an average optical transmittance of greater than about 70% in the second wavelength range. Further, a best linear fit to the band edge correlating the optical transmittance to the wavelength at least across a wavelength range where the optical transmittance along the band edge increases from about 10% to at least about 70% has a slope greater than about 3%/nm.

BRIEF DESCRIPTION OF DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
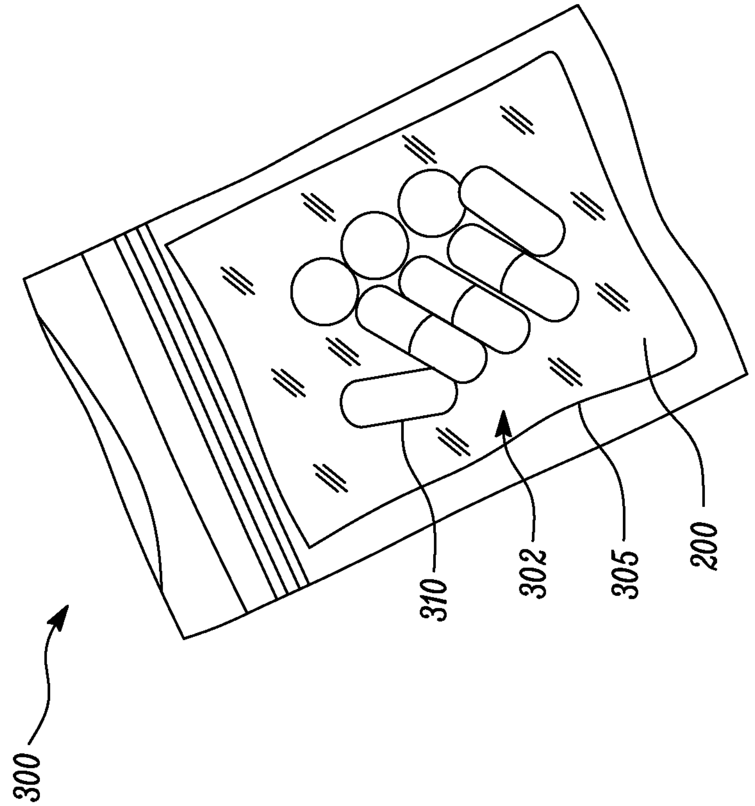
FIG. 1 illustrates a schematic view of a package for protecting a light sensitive material disposed therein, in accordance with an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a package including an optical film. The package including the optical film may be used for protecting a light sensitive material disposed within the package.

Various packages, enclosing the light sensitive material, may be exposed to various conditions including being exposed to ambient light. In some cases, ambient light may include both ultraviolet light (UV) and visible light. Such packages may therefore be irradiated with UV light as well as visible light. Various light sensitive materials, such as drugs and certain chemicals, are generally vulnerable to photo-degradation when exposed to UV light. Such light sensitive materials typically undergo a chemical change upon being irradiated by UV light. The chemical change may lead to a change in chemical properties, which, in turn, may lead to the light sensitive material having diminished properties or even being rendered unusable. In some cases, such packages may also have to allow visual inspection of the light sensitive material from outside. Conventional packages may be unable to substantially block UV light. Further, conventional packages may not facilitate visual inspection of the light sensitive material or product disposed within such packages. In some cases, such conventional packages may tend to block some portion of visible light, resulting in an undesirable color of the package.

In an aspect, the present disclosure provides a package for protecting a light sensitive material disposed therein. The package includes an optical film including a plurality of polymeric layers numbering at least 20 in total. Each of the polymeric layers has an average thickness of less than about 500 nanometers (nm). For a substantially normally incident light, an optical transmittance of the optical film versus wavelength includes a band edge separating a first wavelength range including at least wavelengths from about 360 nm to about 400 nm from a second wavelength range including at least wavelengths from about 520 nm to about 680 nm. For the substantially normally incident light, the optical film has an average optical transmittance of less than about 15% in the first wavelength range and an average optical transmittance of greater than about 70% in the second wavelength range. Further, a best linear fit to the band edge correlating the optical transmittance to the wavelength at least across a wavelength range where the optical transmittance along the band edge increases from about 10% to at least about 70% has a slope greater than about 3%/nm.

Thus, the optical film of the present disclosure may have a relatively low optical transmittance for a substantially normally incident light in the first wavelength range from about 360 nm to about 400 nm. The first wavelength range may correspond to a UV wavelength range. The package including the optical film may therefore have an overall low transmittance for UV light having wavelengths from about 360 nm to about 400 nm. This may protect the light sensitive material disposed within the package from the detrimental effects of exposure to UV light. Such detrimental effects may include photo-degradation that may otherwise cause an irreversible change in chemical properties of the light sensitive material.

Further, for substantially normal incidence, the optical transmittance versus wavelength of the optical film includes the band edge that is relatively sharp (e.g., having a slope of at least 3%/nm in the corresponding best linear fit) as compared to conventional films. The band edge may separate the UV wavelength range from a visible wavelength range, such that the optical film may substantially block UV light, while substantially transmitting at least a major portion of the visible wavelength range. Further, the optical film may have a relatively high transmittance for green light and red light corresponding to the second wavelength range. Hence, due to the sharpness of the band edge of the optical transmittance of the optical film versus wavelength, the package may substantially transmit visible light through the optical film, thus enabling the package to be substantially color neutral. The package including the optical film may therefore be substantially optically clear without any undesirable color. As a result, the package may facilitate visual inspection of the light sensitive material disposed within the package.

In some cases, the band edge of the optical transmittance of the optical film versus wavelength may be sharp even at different oblique angles of incidence (e.g., about 20 degrees, about 40 degrees, about 60 degrees, etc.). Consequently, the optical film may substantially block UV light and substantially transmit visible light in at least the second wavelength range even when the band edge undergoes varying degrees of shift towards a blue end of the visible spectrum at different oblique angles of incidence. The sharpness of the band edge may therefore allow the optical film to be substantially clear even at various oblique angles of incidence. As a result, the package may facilitate visual inspection of the light sensitive material disposed within the package for a wider range of viewing angles.

In some cases, the optical film of the present disclosure may further minimize a color shift due to change in viewing angles. For example, magnitudes of changes in colorimetric parameters between substantially normal incidence and various oblique incident angles (e.g., 40 degrees) for the optical film may be relatively low as compared to conventional films. The colorimetric parameters may be a* and b* coordinates as per CIE Lab color space. Therefore, the optical film may be substantially optically clear with minimal color shift for various angles of incidence. As a result, the package may facilitate visual inspection of the light sensitive material disposed within the package for a wider range of viewing angles.

The package of the present disclosure may be implemented in applications, such as drug and chemical storage, food storage, and any other application requiring substantial blocking of UV light with substantial transmittance of the visible light. The optical film of the present disclosure may also be implemented in various non-packaging applications, such as eyeglasses, visors, displays of electronic devices, windows, etc. It may be appreciated that a structure of the package and the optical film may be modified to shift the band edge of the optical film as per desired application attributes, and that a modified structure of the package and optical film falls within the scope of the present disclosure.

Referring now to figures, FIG. 1 illustrates a package 300 for protecting a light sensitive material 310 disposed therein, according to an embodiment of the present disclosure. In some embodiments, the package 300 includes a storage space 302 provided therein. The storage space 302 receives the light sensitive material 310. The light sensitive material 310 may be any material that is sensitive to light. In other words, the light sensitive material 310 may be any material that can be adversely affected by exposure to light. For example, the light sensitive material 310 may be any material that is sensitive to ultraviolet (UV) light. In some embodiments, the light sensitive material 310 may be any of drugs, chemicals, food items and other materials sensitive to UV light. In the illustrated embodiment of FIG. 1, the light sensitive material 310 includes drugs, in the form of tablets, capsules or both. Further, UV light may include wavelengths of light up to about 400 nanometers (nm). Specifically, UV light may include wavelengths of light from about 360 nm to about 400 nm.

In some embodiments, the package 300 includes at least one cover member 305. In some embodiments, the at least one cover member 305 is disposed such that the storage space 302 of the package 300 is bound at least partially by the at least one cover member 305. In some embodiments, the cover member 305 may be substantially optically transparent to one or more wavelengths of light. In some embodiments, the at least one cover member 305 includes an optical film 200. Thus, the package 300 includes the optical film 200.

Figure 2:
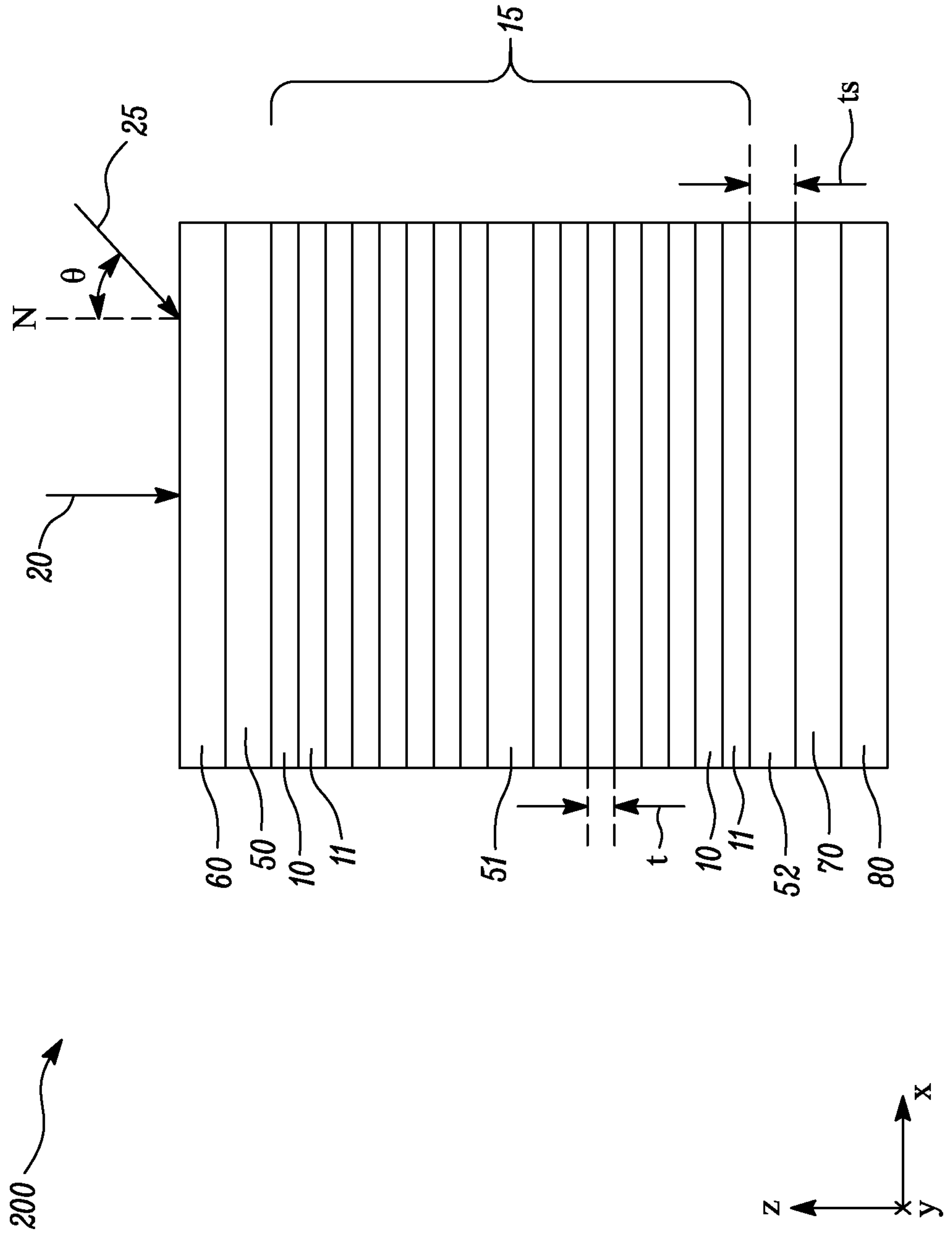
FIG. 2 illustrates a detailed schematic sectional view of an optical film of the package of FIG. 1, in accordance with an embodiment of the present disclosure.

Referring now to FIG. 2, a detailed schematic sectional view of the optical film 200 is illustrated. The optical film 200 defines mutually orthogonal x, y, and z-axes. The x and y-axes are in-plane axes of the optical film 200, while the z-axis is a transverse axis disposed along a thickness of the optical film 200. In other words, x and y-axes are along a plane of the optical film 200, and the z axis is perpendicular to the plane of the optical film 200.

The optical film 200 includes a plurality of polymeric layers 15 numbering at least 20 in total. In some embodiments, the plurality of polymeric layers 15 may number at least 50, at least 100, at least 200, or at least 300 in total. In some embodiments, the plurality of polymeric layers 15 includes a plurality of alternating first and second polymeric layers 10, 11. The first and second polymeric layers 10, 11 are arranged along a thickness (i.e., the z-axis) of the optical film 200.

In some embodiments, desired properties of the optical film 200 may be achieved by varying various parameters of the optical film 200, such as materials, thicknesses, and count of the first and second polymeric layers 10, 11, a thickness gradient of the plurality of polymeric layers 15, etc., or any combination thereof.

In some embodiments, the plurality of polymeric layers 15 may include one or more polymeric materials, for example, polyethylene naphthalate (PEN), copolymers containing PEN and polyesters (e.g., polyethylene terephthalate (PET) or dibenzoic acid), glycol modified polyethylene terephthalate, polycarbonate (PC), poly (methyl methacrylate) (PMMA), or blends of these classes of materials.

In some embodiments, each of the first polymeric layers 10 includes a high index optical (HIO) layer of PET homopolymer (100 mol % terephthalic acid with 100 mol % ethylene glycol) having a glass transition temperature (Tg) from about 81 degrees Celsius (° C.) to about 83° C. In some embodiments, each of the first polymeric layers 10 includes a HIO layer of PEN. In some embodiments, each of the first polymeric layers 10 includes a HIO layer of low melt PEN.

In some embodiments, each of the second polymeric layers 11 includes a low index optical (LIO) layer of CoPMMA, available, for example, from Plaskolite, Columbus, OH, under the tradename OPTIX and having a Tg of about 80° C. In some embodiments, each of the second polymeric layers 11 includes a LIO layer of CoPET (copolymer of polyethylene terephthalate) or CoPEN (copolymer of poly methyl methacrylate) or a blend of polycarbonate and CoPET. In some embodiments, each of the second polymeric layers 11 includes a LIO layer of poly(methyl methacrylate) or PMMA, as an example available from Arkema, Pasadena, TX, USA, having a Tg of 100 degrees centigrade.

Each of the polymeric layers 15 has an average thickness "t". Specifically, each of the polymeric layers 15 defines the average thickness "t" along the z-axis. The term "average thickness", as used herein, refers to an average thickness across a plane (i.e., the x-y plane) of a polymeric layer. In the illustrated embodiment of FIG. 2, the average thickness "t" is measured along the z-axis and across the x-y plane. In some embodiments, each of the polymeric layers 15 has the average thickness "t" of less than about 500 nm. In some embodiments, each of the polymeric layers 15 has the average thickness "t" of less than about 400 nm, less than about 300 nm, or less than about 200 nm.

In some embodiments, the optical film 200 further includes at least one skin layer 50, 51, 52. In some embodiments, the at least one skin layer 50, 51, 52 has an average thickness "ts". The term "average thickness", as used herein, refers to an average thickness across a plane of a skin layer. In the illustrated embodiment of FIG. 2, the average thickness "ts" is measured along the z-axis and across the x-y plane. In some embodiments, the at least one skin layer 50, 51, 52 has the average thickness "ts" of greater than about 500 nm. In some embodiments, the at least one skin layer 50, 51, 52 has the average thickness "ts" of greater than about 750 nm, or greater than about 1000 nm.

In some embodiments, the at least one skin layer 50, 51, 52 is disposed at least one of on and between the polymeric layers 10, 11 in the plurality of polymeric layers 15. In some embodiments, the at least one skin layer includes the skin layers 50, 52 disposed on the plurality of polymeric layers 10, 11. Further, the at least one skin layer includes the skin layer 51 disposed between the plurality of polymeric layers 10, 11.

In the illustrated embodiment of FIG. 2, the skin layers 50, 52 correspond to a pair of opposing outermost skin layers 50, 52. The pair of opposing outermost skin layers 50, 52 may act as protective layers of the optical film 200. For example, the skin layers 50, 52 of FIG. 2 may act as protective boundary layers (PBL) of the optical film 200.

In the illustrated embodiment of FIG. 2, the skin layer 51 is disposed between a first polymeric layer 10 and a second polymeric layer 11.

In some embodiments, the optical film 200 further includes an optical adhesive layer 60 disposed on the plurality of polymeric layers 15. The optical adhesive layer 60 may be substantially optically clear. The term "optically clear", as used herein, means having an average optical transmittance of greater than about 90% for a light in a wavelength range from about 400 nm to about 700 nm. In other words, the term "optically clear" means having an average optical transmittance of greater than about 90% for a light in the visible wavelength range. In some embodiments, the optical adhesive layer 60 includes an optically clear adhesive (OCA). In some other embodiments, the optical adhesive layer 60 may include epoxy, lamination, or any other suitable layer.

Referring to FIGS. 1 and 2, in some embodiments, the optical film 200 may be arranged in the package 300 such that the optical adhesive layer 60 of the optical film 200 is disposed proximate an external surface (not shown) of the package 300. In some embodiments, one or more additional films may be attached to the optical film 200 via the optical adhesive layer 60. In some embodiments, the one or more additional films may include a removable liner or a removable lidding film associated with the package 300.

In some embodiments, the optical film 200 further includes a barrier layer 70. The barrier layer 70 is disposed on and has at least one of lower oxygen permeability and water vapor permeability than the plurality of polymeric layers 15. In the illustrated embodiment of FIG. 2, the barrier layer 70 is disposed on the plurality of polymeric layers 15, opposite the optical adhesive layer 60. Further, the barrier layer 70 is disposed adjacent to the skin layer 52. In some embodiments, the barrier layer 70 may have both lower oxygen permeability and lower water vapor permeability than the plurality of polymeric layers 15. The barrier layer 70 may limit permeation of oxygen and/or water vapor from an external environment into the storage space 302 of the package 300.

In some cases, the light sensitive material 310 may additionally be sensitive to oxygen. In some embodiments, the barrier layer 70 may have an oxygen permeability that is lower than an oxygen permeability of the plurality of polymeric layers 15. Thus, the barrier layer 70 may limit permeation of oxygen from the external environment to the light sensitive material 310.

In some cases, the light sensitive material 310 may additionally be sensitive to water vapor. In some embodiments, the barrier layer 70 may have a water vapor permeability that is lower than a water vapor permeability of the plurality of polymeric layers 15. Thus, the barrier layer 70 may limit permeation of water vapor from the external environment to the light sensitive material 310.

With continued reference to FIGS. 1 and 2, in some embodiments, the optical film 200 further includes a heat sealable layer 80 disposed on the plurality of polymeric layers 15 for sealing the light sensitive material 310 inside the package 300 when the heat sealable layer 80 is activated by at least one of heat and pressure. In other words, for some embodiments, the heat sealable layer 80, when activated, forms a seal between the light sensitive material 310 disposed in the package 300, and the external environment. In some embodiments, the heat sealable layer 80 includes one or more of ethylene vinyl acetate (EVA), ethylene acrylic acid (EAA), ethylene methyl acrylate (EMA), ethylene methacrylic acid (EMAA), and ethylene ethyl acrylate (EEA).

In the illustrated embodiment of FIG. 2, the heat sealable layer 80 is disposed on the plurality of polymeric layers 15, opposite the optical adhesive layer 60. Further, the heat sealable layer 80 is disposed adjacent to the barrier layer 70.

In some embodiments, the optical adhesive layer 60, the plurality of polymeric layers 15, the skin layers 50, 51, 52, the barrier layer 70, and the heat sealable layer 80 may be substantially co-extensive with each other, or of comparable in-plane dimensions (i.e., length and width). Specifically, the optical adhesive layer 60, the plurality of polymeric layers 15, the skin layers 50, 51, 52, the barrier layer 70, and the heat sealable layer 80 may be substantially co-extensive with each other in the x-y plane. In the illustrated embodiment of FIG. 2, the optical adhesive layer 60, the plurality of polymeric layers 15, the skin layers 50, 51, 52, the barrier layer 70, and the heat sealable layer 80 are disposed adjacent to each other along the z-axis of the optical film 200.

In some embodiments, the optical film 200 may include additional or intermediate layers, such as light re-directing layers, color filter layers, substrate layers, etc. The optical film 200 may, in total, be of any suitable thickness based on desired application attributes.

FIG. 2 further illustrates an incident light 20 incident on the optical film 200. In some embodiments, the incident light 20 is incident on the optical adhesive layer 60 of the optical film 200. In some embodiments, the incident light 20 may be incident substantially normally on the optical film 200, i.e., the incident light 20 may be propagating substantially parallel to a normal N to the x-y plane of the optical film 200. In some embodiments, the incident light 20 incident substantially normally on the optical film 200 may have an incident angle of less than about 5 degrees relative to the normal N.

FIG. 2 also illustrates an incident light 25 incident on the optical film 200. In some embodiments, the incident light 25 is obliquely incident on the optical adhesive layer 60 of the optical film 200. In some embodiments, the incident light 25 may be incident on the optical film 200 at an incident angle θ measured with respect to the normal N. In some embodiments, the incident light 25 may be incident at the incident angle θ greater than about 10 degrees. In some embodiments, the incident angle θ may be about 20 degrees, about 40 degrees, or about 60 degrees with respect to the normal N.

Figure 3A:
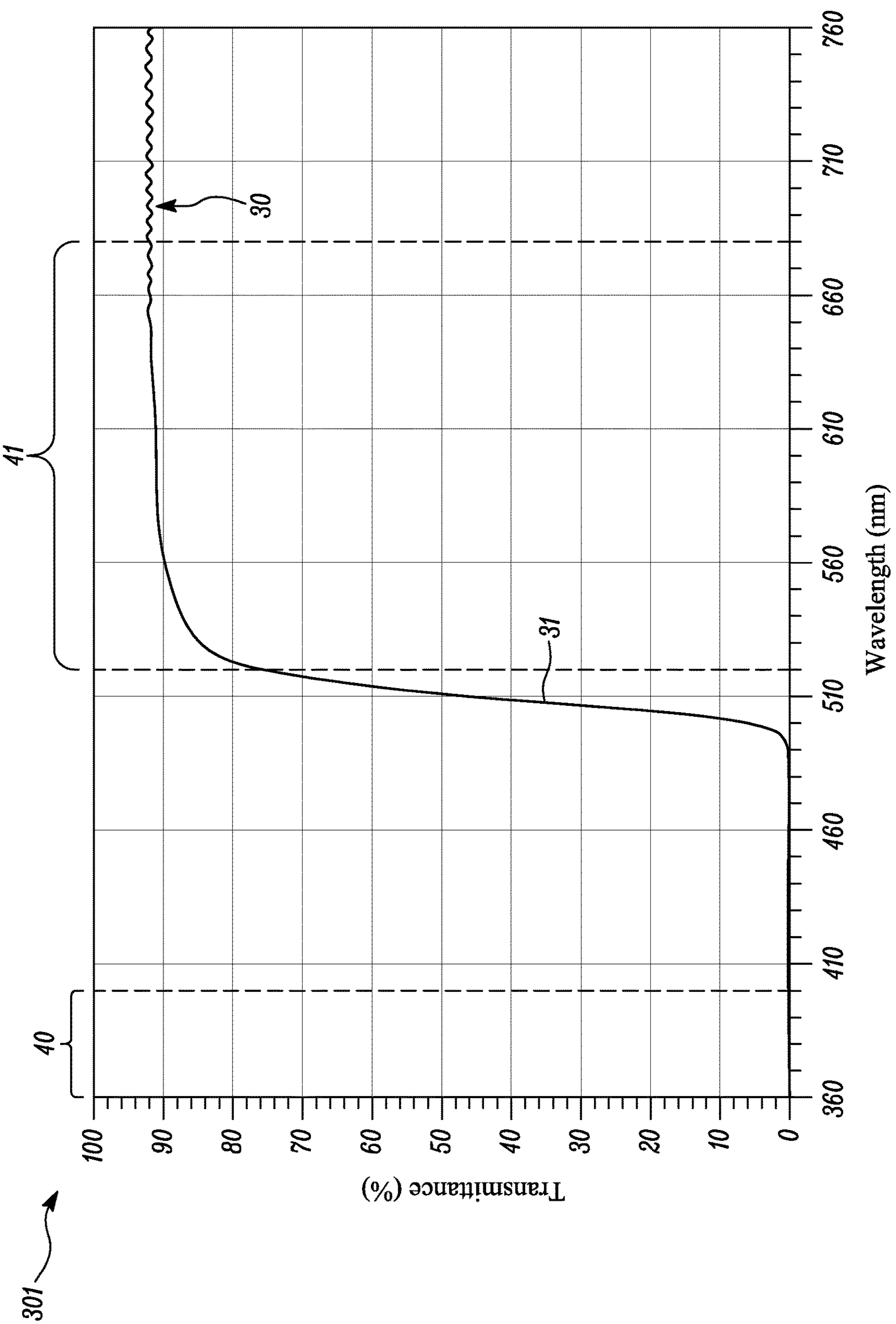
FIG. 3A illustrates a graph depicting optical transmittance versus wavelength, for substantially normal incidence, of the optical film of FIG. 2, in accordance with an embodiment of the present disclosure.

FIG. 3A illustrates a graph 301 depicting optical transmittance versus wavelength of the optical film 200 (shown in FIG. 2), according to an embodiment of the present disclosure. Wavelength is expressed in nanometers (nm) in the abscissa. Optical transmittance is expressed as a transmittance percentage in the left ordinate.

Referring now to FIGS. 2 and 3A, as shown in the graph 301, for the substantially normally incident light 20, an optical transmittance of the optical film versus wavelength 30 includes a band edge 31. The band edge 31 separates a first wavelength range 40 including at least wavelengths from about 360 nm to about 400 nm from a second wavelength range 41 including at least wavelengths from about 520 nm to about 680 nm. In some embodiments, the band edge 31 may separate a wavelength range including at least wavelengths from about 360 nm to about 480 nm from the second wavelength range 41.

In some embodiments, the first wavelength range 40 includes at least UV light. For example, the first wavelength range 40 includes at least some wavelengths in an ultraviolet (UV) wavelength range from about 360 nm to about 400 nm. In some embodiments, the second wavelength range 41 includes at least green light and red light. The second wavelength range 41 may therefore include at least some wavelengths in a visible wavelength range. In some embodiments, the visible wavelength range at least extends from about 420 nm to about 680 nm.

The optical transmittance of the optical film versus wavelength 30 is interchangeably referred to as "the optical transmittance versus wavelength 30". The optical transmittance versus wavelength 30 therefore illustrates a variation of the optical transmittance of the optical film 200 with wavelength for the substantially normally incident light 20.

Referring to the optical transmittance versus wavelength 30 in the graph 301, in some embodiments, for the substantially normally incident light 20, the optical film 200 has an average optical transmittance of less than about 15% in the first wavelength range 40. In some embodiments, for the substantially normally incident light 20, the optical film 200 has the average optical transmittance of less than about 10%, less than about 5%, less than about 2.5%, less than about 1.5%, or less than about 1% in the first wavelength range 40. In some embodiments, for the substantially normally incident light 20, the optical film 200 has the average optical transmittance of about 0% in the first wavelength range 40.

Referring to the optical transmittance versus wavelength 30 in the graph 301, in some embodiments, for the substantially normally incident light 20, the optical film 200 has an average optical transmittance of greater than about 70% in the second wavelength range 41. In some embodiments, for the substantially normally incident light 20, the optical film 200 has the average optical transmittance of greater than about 75%, greater than about 80%, or greater than about 85% in the second wavelength range 41. In some embodiments, for the substantially normally incident light 20, the optical film 200 has the average optical transmittance of about 88.3% in the second wavelength range 41.

Referring to the optical transmittance versus wavelength 30 in the graph 301, in some embodiments, the optical film 200 has a 50% optical transmittance along the band edge 31 at a wavelength of between about 400 nm and about 530 nm. In some embodiments, the optical film 200 has a 50% optical transmittance along the band edge 31 at a wavelength of between about 500 nm and about 530 nm.

Figure 3B:
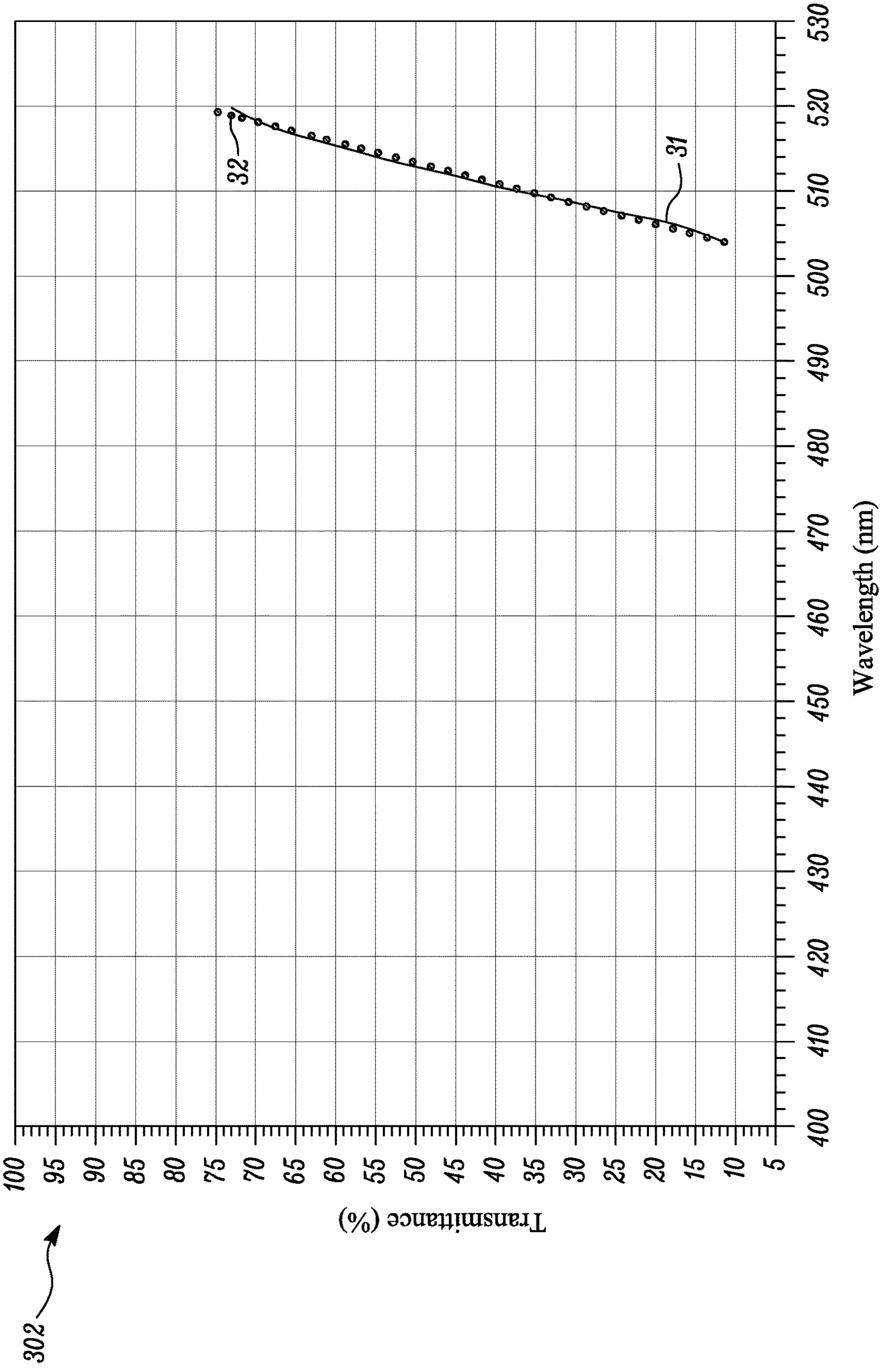
FIG. 3B illustrates a graph depicting a best linear fit of a band edge of the optical transmittance versus wavelength depicted in FIG. 3A, in accordance with an embodiment of the present disclosure.

FIG. 3B illustrates a graph 302 depicting a best linear fit 32 to the band edge 31 (also shown in FIG. 3A) of the optical transmittance versus wavelength 30 of the optical film 200 (shown in FIG. 2), according to an embodiment of the present disclosure. The band edge 31 correlates the optical transmittance to the wavelength at least across a wavelength range where the optical transmittance increases from about 10% to at least about 70%. The best linear fit 32 to the band edge 31 has a slope S1 and a r-squared value R1. In some embodiments, the best linear fit 32 to the band edge 31 correlating the optical transmittance to the wavelength at least across the wavelength range where the optical transmittance along the band edge 31 increases from about 10% to at least about 70% has the slope S1 greater than about 3%/nm. In some embodiments, the band edge 31 correlates the optical transmittance to the wavelength at least across a wavelength range from about 505 nm to about 520 nm where the optical transmittance increases from about 10% to at least about 70%. In some embodiments, the best linear fit 32 has the slope S1 greater than about 3.5%/nm, greater than about 4%/nm, greater than about 4.5%/nm, greater than about 5%/nm, or greater than about 5.5%/nm.

The best linear fit 32 can be determined as a linear least squares fit to the optical transmittance versus wavelength 30 at least across the wavelength range (e.g., a region of the band edge 31) where the optical transmittance increases from about 10% to at least about 70%. The r-squared value may also be known as co-efficient of determination. The r-squared value is a statistical measure of goodness of fit of a linear fit with a respective plot, and can range from a value of 0 indicating a negligible fit, to a value of 1 indicating a perfect fit. Generally, a r-squared value of greater than 0.9 may be considered as a good fit.

In some cases, the best linear fit 32 is according to Equation 1 provided below, $$y=4.0151x-2012.1 \quad \text{(Equation 1)}$$

In Equation 1, "y" denotes the average optical transmittance of the optical film 200 for the substantially normally incident light 20, and "x" denotes the wavelength. Further, S1=4.0151; and R1=0.9914.

Figure 3C:
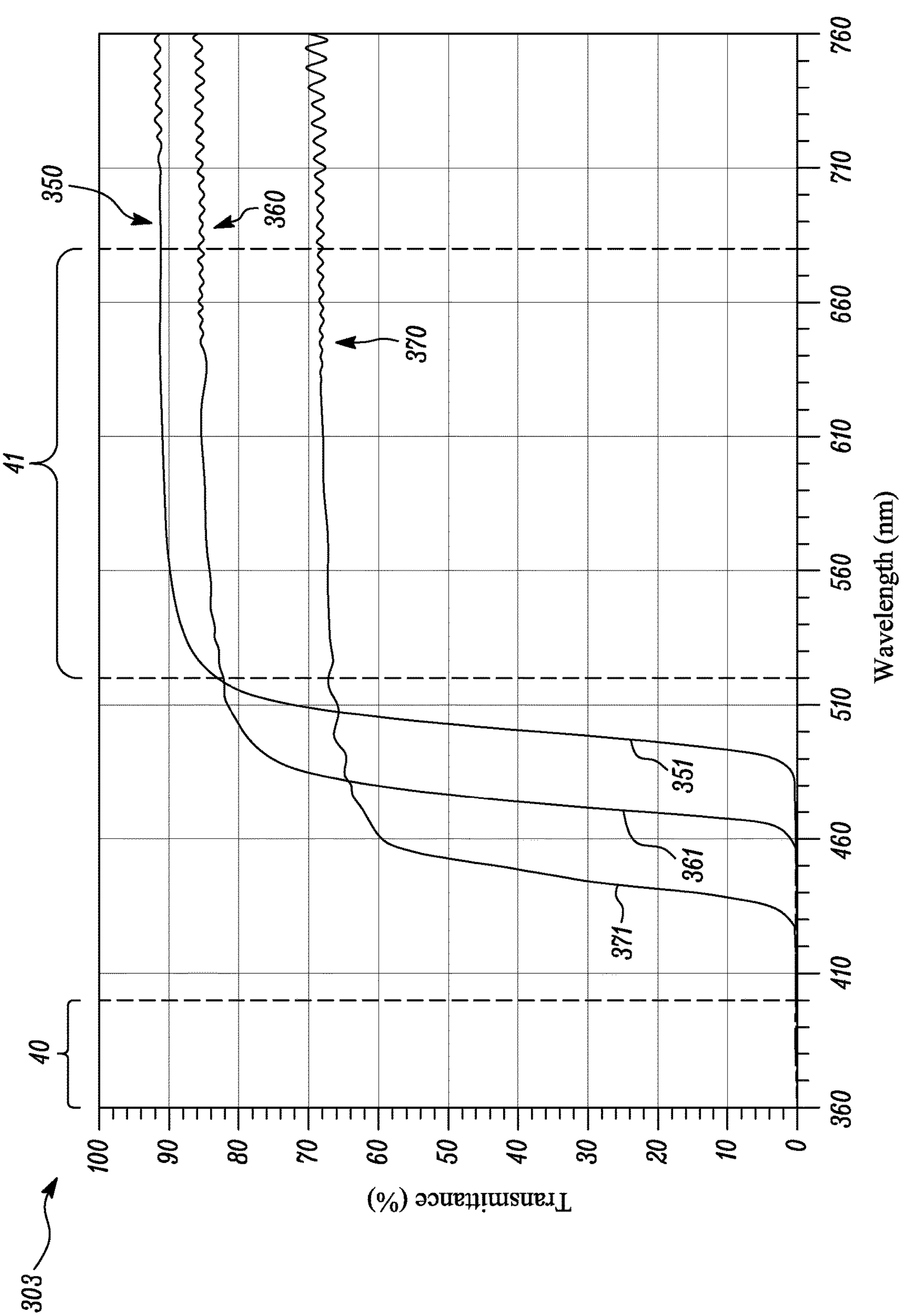
FIG. 3C illustrates a graph depicting optical transmittances versus wavelength, for different incident angles, of the optical film having a similar configuration as that of the optical film corresponding to FIG. 3A, in accordance with an embodiment of the present disclosure.

FIG. 3C illustrates a graph 303 depicting optical transmittance versus wavelength of the optical film 200 (shown in FIG. 2), according to another embodiment of the present disclosure. A configuration of the optical film 200 corresponding to FIG. 3C may be substantially similar to a configuration of the optical film 200 corresponding to FIG. 3A. Wavelength is expressed in nanometers (nm) in the abscissa. Optical transmittance is expressed as a transmittance percentage in the left ordinate.

Referring to FIGS. 2 and 3C, for the incident light 25 incident at the incident angle θ of about 20 degrees, the graph 303 depicts an optical transmittance of the optical film versus wavelength 350. The optical transmittance of the optical film versus wavelength 350 is interchangeably referred to as "the optical transmittance versus wavelength 350". The optical transmittance versus wavelength 350 therefore illustrates a variation of the optical transmittance of the optical film 200 with wavelength for the incident light 25 incident at the incident angle θ of about 20 degrees.

The optical transmittance versus wavelength 350 includes a band edge 351 separating the first wavelength range 40 including at least wavelengths from about 360 nm to about 400 nm from the second wavelength range 41 including at least wavelengths from about 520 nm to about 680 nm. In some embodiments, the band edge 351 further separates a wavelength range including at least wavelengths from about 360 nm to about 480 nm from another wavelength range including at least wavelengths from about 520 nm to about 680 nm. Further, in some embodiments, the band edge 351 correlates the optical transmittance to the wavelength at least across a wavelength range from about 495 nm to about 515 nm where the optical transmittance increases from about 10% to at least about 70%.

Referring to FIGS. 2 and 3C, for the incident light 25 incident at the incident angle θ of about 40 degrees, the graph 303 depicts an optical transmittance of the optical film versus wavelength 360. The optical transmittance of the optical film versus wavelength 360 is interchangeably referred to as "the optical transmittance versus wavelength 360". The optical transmittance versus wavelength 360 therefore illustrates a variation of the optical transmittance of the optical film 200 with wavelength for the incident light 25 incident at the incident angle θ of about 40 degrees.

The optical transmittance versus wavelength 360 includes a band edge 361 separating the first wavelength range 40 including at least wavelengths from about 360 nm to about 400 nm from the second wavelength range 41 including at least wavelengths from about 520 nm to about 680 nm. In some embodiments, the band edge 361 further separates a wavelength range including at least wavelengths from about 360 nm to about 450 nm from another wavelength range including at least wavelengths from about 500 nm to about 680 nm. Further, in some embodiments, the band edge 361 correlates the optical transmittance to the wavelength at least across a wavelength range from about 470 nm to about 490 nm where the optical transmittance increases from about 10% to at least about 70%.

Referring again to FIGS. 2 and 3C, for the incident light 25 incident at the incident angle θ of about 60 degrees, the graph 303 depicts an optical transmittance of the optical film versus wavelength 370. The optical transmittance of the optical film versus wavelength 370 is interchangeably referred to as "the optical transmittance versus wavelength 370". The optical transmittance versus wavelength 370 therefore illustrates a variation of the optical transmittance of the optical film 200 with wavelength for the incident light 25 incident at the incident angle θ of about 60 degrees.

The optical transmittance versus wavelength 370 includes a band edge 371 separating the first wavelength range 40 including at least wavelengths from about 360 nm to about 400 nm from the second wavelength range 41 including at least wavelengths from about 520 nm to about 680 nm. In some embodiments, the band edge 371 further separates a wavelength range including at least wavelengths from about 360 nm to about 420 nm from another wavelength range including at least wavelengths from about 470 nm to about 680 nm. Further, in some embodiments, the band edge 371 correlates the optical transmittance to the wavelength at least across a wavelength range from about 440 nm to about 450 nm where the optical transmittance increases from about 10% to at least about 50%.

Referring to the optical transmittances 350, 360, 370 in the graph 303, each of the band edges 351, 361, 371 separates the first wavelength range 40 from the second wavelength range 41. In some embodiments, the optical film 200 has an average optical transmittance of greater than about 50% in the second wavelength range 41 for the incident light 25 incident at each of the incident angles of about 20 degrees, about 40 degrees, and about 60 degrees. Further, in some embodiments, the optical film 200 has an average optical transmittance of less than about 15% in the first wavelength range 40 for the incident light 25 incident at each of the incident angles of about 20 degrees, about 40 degrees, and about 60 degrees. Therefore, referring to the graphs 301, 303 shown in FIGS. 3A and 3C, respectively, for both a substantially normally incident light (e.g., the incident light 20 in FIG. 2) and an obliquely incident light (e.g., the incident light 25 in FIG. 2), the optical film 200 may have an average optical transmittance of greater than about 50% in the second wavelength range 41, and an average optical transmittance of less than about 15% in the first wavelength range 40.

Figure 4A:
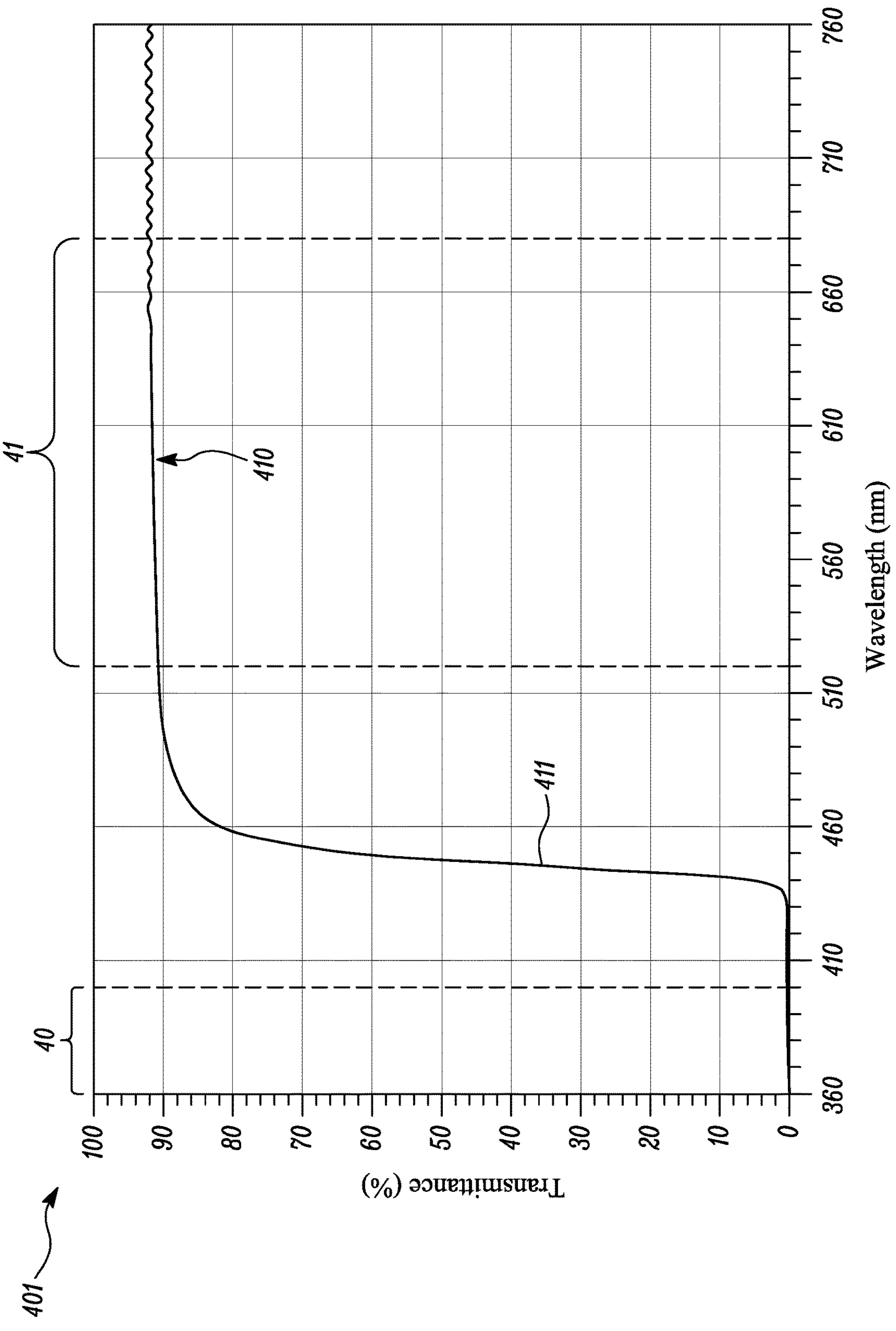
FIG. 4A illustrates a graph depicting optical transmittance versus wavelength, for substantially normal incidence, of the optical film of FIG. 2, in accordance with another embodiment of the present disclosure.

FIG. 4A illustrates a graph 401 depicting optical transmittance versus wavelength of the optical film 200 (shown in FIG. 2), according to another embodiment of the present disclosure. The optical film 200 corresponding to FIG. 4A may have a different configuration from the configuration of the optical film 200 corresponding to FIG. 3A. Wavelength is expressed in nanometers (nm) in the abscissa. Optical transmittance is expressed as a transmittance percentage in the left ordinate.

Referring now to FIGS. 2 and 4A, as shown in the graph 401, for the substantially normally incident light 20, an optical transmittance of the optical film versus wavelength 410 includes a band edge 411. The band edge 411 separates the first wavelength range 40 including at least wavelengths from about 360 nm to about 400 nm from the second wavelength range 41 including at least wavelengths from about 520 nm to about 680 nm. The optical transmittance of the optical film versus wavelength 410 is interchangeably referred to as "the optical transmittance versus wavelength 410". The optical transmittance versus wavelength 410 therefore illustrates a variation of the optical transmittance of the optical film 200 with wavelength for the substantially normally incident light 20.

Referring to the optical transmittance versus wavelength 410 in the graph 401, in some embodiments, for the substantially normally incident light 20, the optical film 200 has an average optical transmittance of less than about 15% in the first wavelength range 40. In some embodiments, for the substantially normally incident light 20, the optical film 200 has the average optical transmittance of less than about 10%, less than about 5%, less than about 2.5%, less than about 1.5%, or less than about 1% in the first wavelength range 40.

Referring to the optical transmittance versus wavelength 410 in the graph 401, in some embodiments, for the substantially normally incident light 20, the optical film 200 has an average optical transmittance of greater than about 70% in the second wavelength range 41. In some embodiments, for the substantially normally incident light 20, the optical film 200 has the average optical transmittance of greater than about 75%, greater than about 80%, or greater than about 85% in the second wavelength range 41.

In some embodiments, the band edge 411 also separates a wavelength range including at least wavelengths from about 360 nm to about 380 nm from another wavelength range including at least wavelengths from about 460 nm to about 680 nm. In some embodiments, for the substantially normally incident light 20, the optical film 200 has an average optical transmittance of less than about 15% for the wavelength range including at least wavelengths from about 360 nm to about 380 nm. In some embodiments, for the substantially normally incident light 20, the optical film 200 has an average optical transmittance of greater than about 70% for the wavelength range including at least wavelengths from about 460 nm to about 680 nm.

Referring to the optical transmittance versus wavelength 410 in the graph 401, in some embodiments, the optical film 200 has a 50% optical transmittance along the band edge 411 at a wavelength of between about 400 nm and about 530 nm. In some embodiments, the optical film 200 has a 50% optical transmittance along the band edge 411 at a wavelength of between about 435 nm and about 465 nm.

Referring to the graphs 301, 401 shown in FIGS. 3A, 4A, respectively, for substantially normal incidence, the band edge 411 of the optical transmittance versus wavelength 410 is disposed nearer to the first wavelength range 40 as compared to the band edge 31 of the optical transmittance versus wavelength 30. Referring to the optical transmittance versus wavelength 410, the optical film 200 has an average optical transmittance of greater than about 70% in a wavelength range from about 460 nm to about 500 nm. Referring to the optical transmittance versus wavelength 30, the optical film 200 has an average optical transmittance of less than about 15% in the wavelength range from about 460 nm to about 500 nm. Therefore, in the wavelength range from about 460 nm to about 500 nm, the optical film 200 having the configuration corresponding to FIG. 4A may have a relatively higher optical transmittance than the optical film 200 having the configuration corresponding to FIG. 3A. Hence, a configuration of the optical film 200 may be varied to obtain different optical characteristics based on desired application attributes.

Figure 4B:
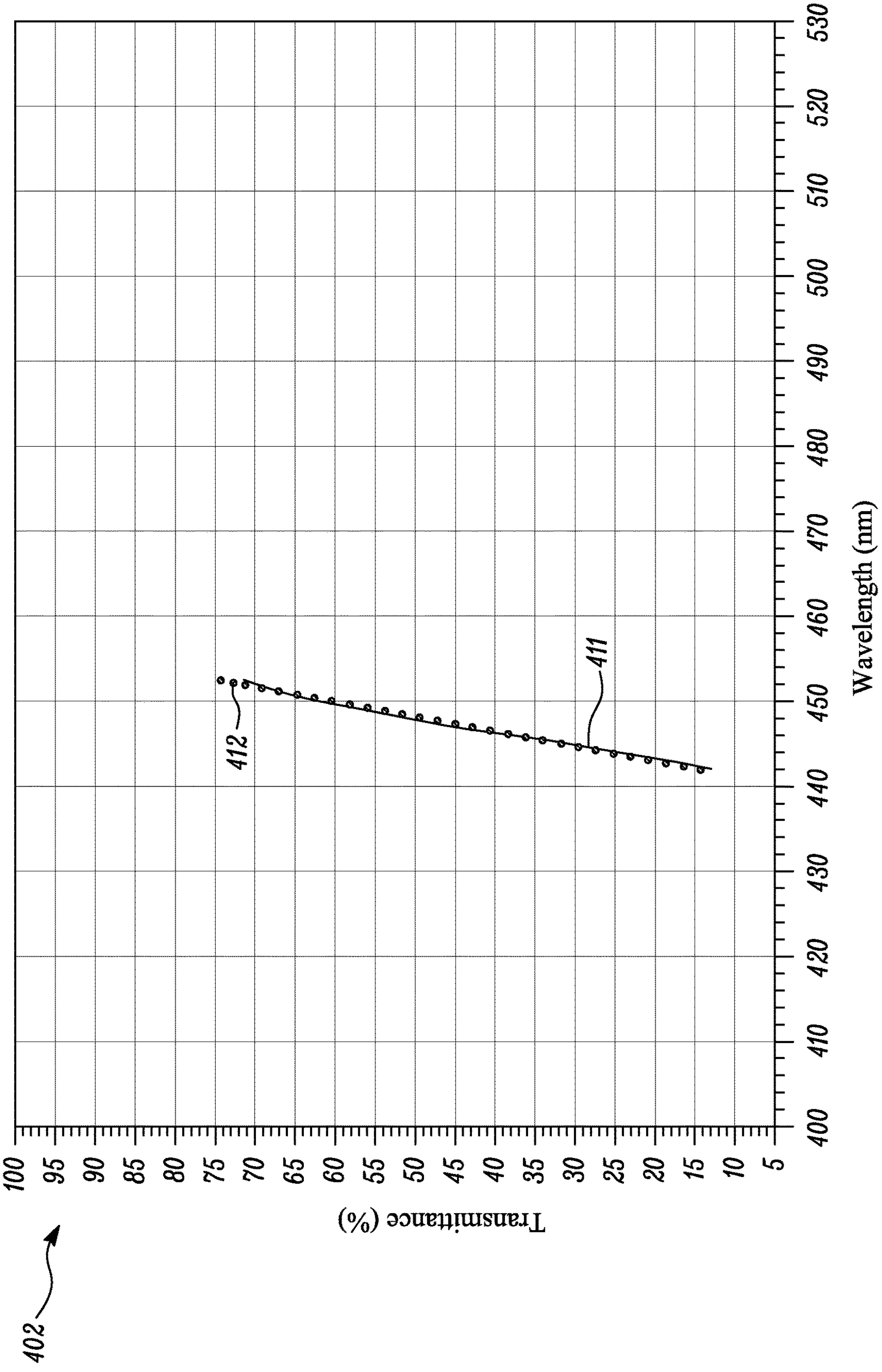
FIG. 4B illustrates a graph depicting a best linear fit of a band edge of the optical transmittance versus wavelength depicted in FIG. 4A, in accordance with an embodiment of the present disclosure.

FIG. 4B illustrates a graph 402 depicting a best linear fit 412 to the band edge 411 (also shown in FIG. 4A) of the optical transmittance versus wavelength 410 of the optical film 200 (shown in FIG. 2), according to an embodiment of the present disclosure. The band edge 411 correlates the optical transmittance to the wavelength at least across a wavelength range where the optical transmittance increases from about 10% to at least about 70%. The best linear fit 412 to the band edge 411 has a slope S2 and a r-squared value R2. In some embodiments, the best linear fit 412 to the band edge 411 correlating the optical transmittance to the wavelength at least across the wavelength range where the optical transmittance along the band edge 411 increases from about 10% to at least about 70% has the slope S2 greater than about 3%/nm. In some embodiments, the band edge 411 correlates the optical transmittance to the wavelength at least across a wavelength range from about 440 nm to about 455 nm where the optical transmittance increases from about 10% to at least about 70%. In some embodiments, the best linear fit 412 has the slope S2 greater than about 3.5%/nm, greater than about 4%/nm, greater than about 4.5%/nm, greater than about 5%/nm, or greater than about 5.5%/nm.

The best linear fit 412 is according to Equation 2 provided below, $$y=5.4822x-2414.5 \quad \text{(Equation 2)}$$

In Equation 2, "y" denotes the average optical transmittance of the optical film 200 for the substantially normally incident light 20, and "x" denotes the wavelength. Further, S2=5.4822; and R2=0.9889.

Figure 4C:
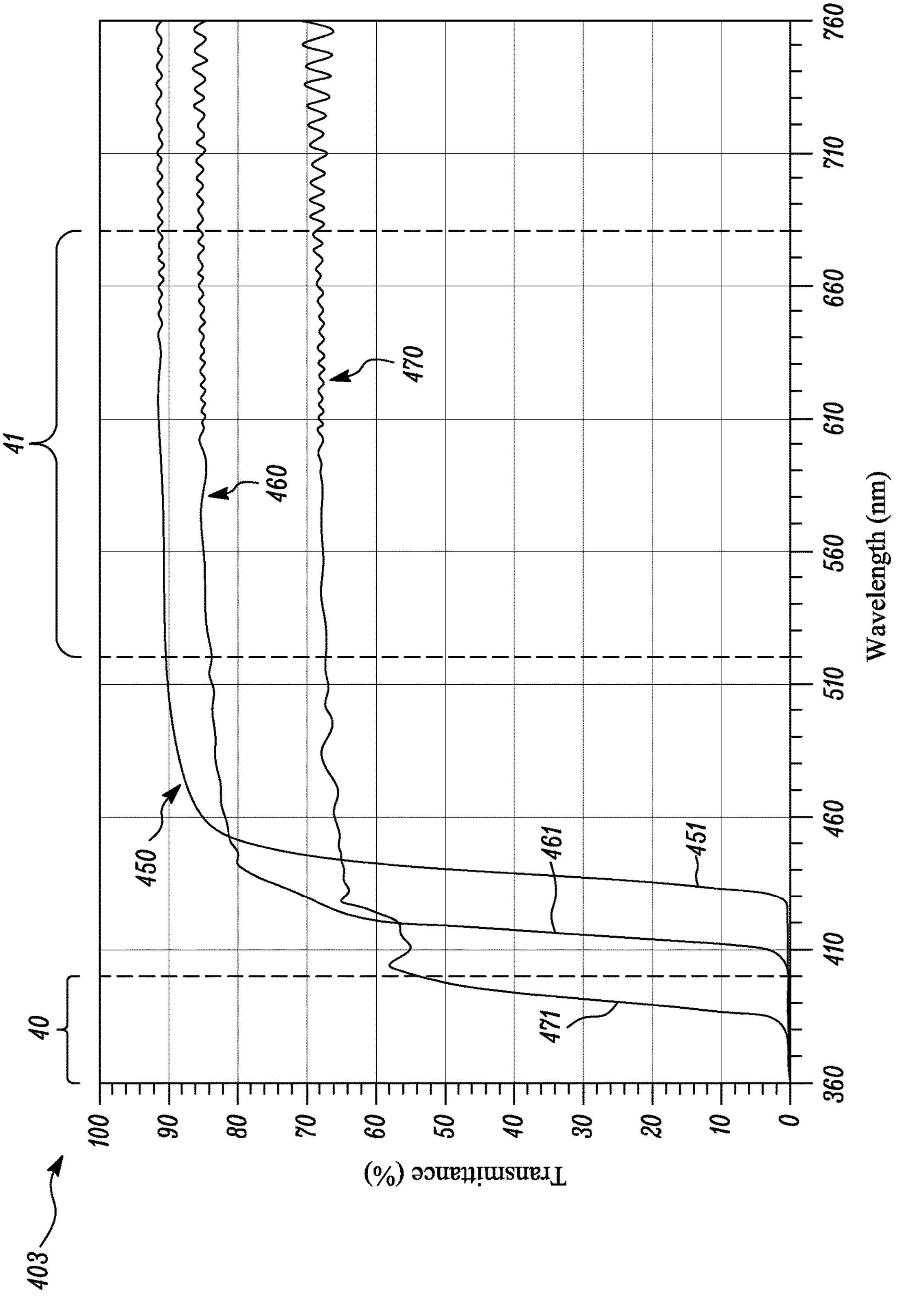
FIG. 4C illustrates a graph depicting optical transmittances versus wavelength, for different incident angles, of the optical film having a similar configuration as that of the optical film corresponding to FIG. 4A, in accordance with an embodiment of the present disclosure.

FIG. 4C illustrates a graph 403 depicting optical transmittance versus wavelength of the optical film 200 (shown in FIG. 2), according to another embodiment of the present disclosure. A configuration of the optical film 200 corresponding to FIG. 4C may be substantially similar to the configuration of the optical film 200 corresponding to FIG. 4A. Wavelength is expressed in nanometers (nm) in the abscissa. Optical transmittance is expressed as a transmittance percentage in the left ordinate.

Referring to FIGS. 2 and 4C, for the incident light 25 incident at the incident angle θ of about 20 degrees, the graph 403 depicts an optical transmittance of the optical film versus wavelength 450. The optical transmittance of the optical film versus wavelength 450 is interchangeably referred to as "the optical transmittance versus wavelength 450". The optical transmittance versus wavelength 450 therefore illustrates a variation of the optical transmittance of the optical film 200 with wavelength for the incident light 25 incident at the incident angle θ of about 20 degrees.

The optical transmittance versus wavelength 450 includes a band edge 451 separating the first wavelength range 40 including at least wavelengths from about 360 nm to about 400 nm from the second wavelength range 41 including at least wavelengths from about 520 nm to about 680 nm. In some embodiments, the band edge 451 further separates a wavelength range including at least wavelengths from about 360 nm to about 420 nm from another wavelength range including at least wavelengths from about 460 nm to about 680 nm. Further, in some embodiments, the band edge 451 correlates the optical transmittance to the wavelength at least across a wavelength range from about 430 nm to about 450 nm where the optical transmittance increases from about 10% to at least about 70%.

Referring to FIGS. 2 and 4C, for the incident light 25 incident at the incident angle θ of about 40 degrees, the graph 403 depicts an optical transmittance of the optical film versus wavelength 460. The optical transmittance of the optical film versus wavelength 460 is interchangeably referred to as "the optical transmittance versus wavelength 460". The optical transmittance versus wavelength 460 therefore illustrates a variation of the optical transmittance of the optical film 200 with wavelength for the incident light 25 incident at the incident angle θ of about 40 degrees.

The optical transmittance versus wavelength 460 includes a band edge 461 separating the first wavelength range 40 including at least wavelengths from about 360 nm to about 400 nm from the second wavelength range 41 including at least wavelengths from about 520 nm to about 680 nm. In some embodiments, the band edge 461 further separates the first wavelength range 40 including at least wavelengths from about 360 nm to about 400 nm from another wavelength range including at least wavelengths from about 450 nm to about 680 nm. Further, in some embodiments, the band edge 461 correlates the optical transmittance to the wavelength at least across a wavelength range from about 410 nm to about 440 nm where the optical transmittance increases from about 10% to at least about 70%.

Referring again to FIGS. 2 and 4C, for the incident light 25 incident at the incident angle θ of about 60 degrees, the graph 403 depicts an optical transmittance of the optical film versus wavelength 470. The optical transmittance of the optical film versus wavelength 470 is interchangeably referred to as "the optical transmittance versus wavelength 470". The optical transmittance versus wavelength 470 therefore illustrates a variation of the optical transmittance of the optical film 200 with wavelength for the incident light 25 incident at the incident angle θ of about 60 degrees.

The optical transmittance versus wavelength 470 includes a band edge 471 separating a wavelength range including at least wavelengths from about 360 nm to about 370 nm from the second wavelength range 41 including at least wavelengths from about 520 nm to about 680 nm. In some embodiments, the band edge 471 further separates the wavelength range including at least wavelengths from about 360 nm to about 370 nm from another wavelength range including at least wavelengths from about 410 nm to about 680 nm. Further, in some embodiments, the band edge 471 correlates the optical transmittance to the wavelength at least across a wavelength range from about 385 nm to about 400 nm where the optical transmittance increases from about 10% to at least about 50%.

Referring to the optical transmittances 450, 460, 470 in the graph 403, each of the band edges 451, 461, 471 separates the wavelength range including at least wavelengths from about 360 nm to about 380 nm from the second wavelength range 41. Each of the band edges 451, 461, 471 further separates the wavelength range including at least wavelengths from about 360 nm to about 380 nm from the wavelength range including at least wavelengths from about 460 nm to about 680 nm. In some embodiments, the optical film 200 has an average optical transmittance of less than about 15% in the wavelength range including at least wavelengths from about 360 nm to about 380 nm for the incident light 25 incident at each of the incident angles of about 20 degrees, about 40 degrees, and about 60 degrees. Further, in some embodiments, the optical film 200 has an average optical transmittance of greater than about 50% in the second wavelength range 41 for the incident light 25 incident at each of the incident angles of about 20 degrees, about 40 degrees, and about 60 degrees. Additionally, in some embodiments, the optical film 200 has an average optical transmittance of greater than about 50% in the wavelength range including at least wavelengths from about 460 nm to about 680 nm for the incident light 25 incident at each of the incident angles of about 20 degrees, about 40 degrees, and about 60 degrees. Therefore, referring to the graphs 401, 403 shown in FIGS. 4A and 4C, respectively, for both a substantially normally incident light (e.g., the incident light 20 in FIG. 2) and an obliquely incident light (e.g., the incident light 25 in FIG. 2), the optical film 200 may have an average optical transmittance of less than about 15% in the wavelength range including at least wavelengths from about 360 nm to about 380 nm, and an average optical transmittance of greater than about 50% in at least the second wavelength range 41. Further, for both the substantially normally incident light and the obliquely incident light, the optical film 200 may have an average optical transmittance of greater than about 50% in the wavelength range including at least wavelengths from about 460 nm to about 680 nm.

Figure 5A:
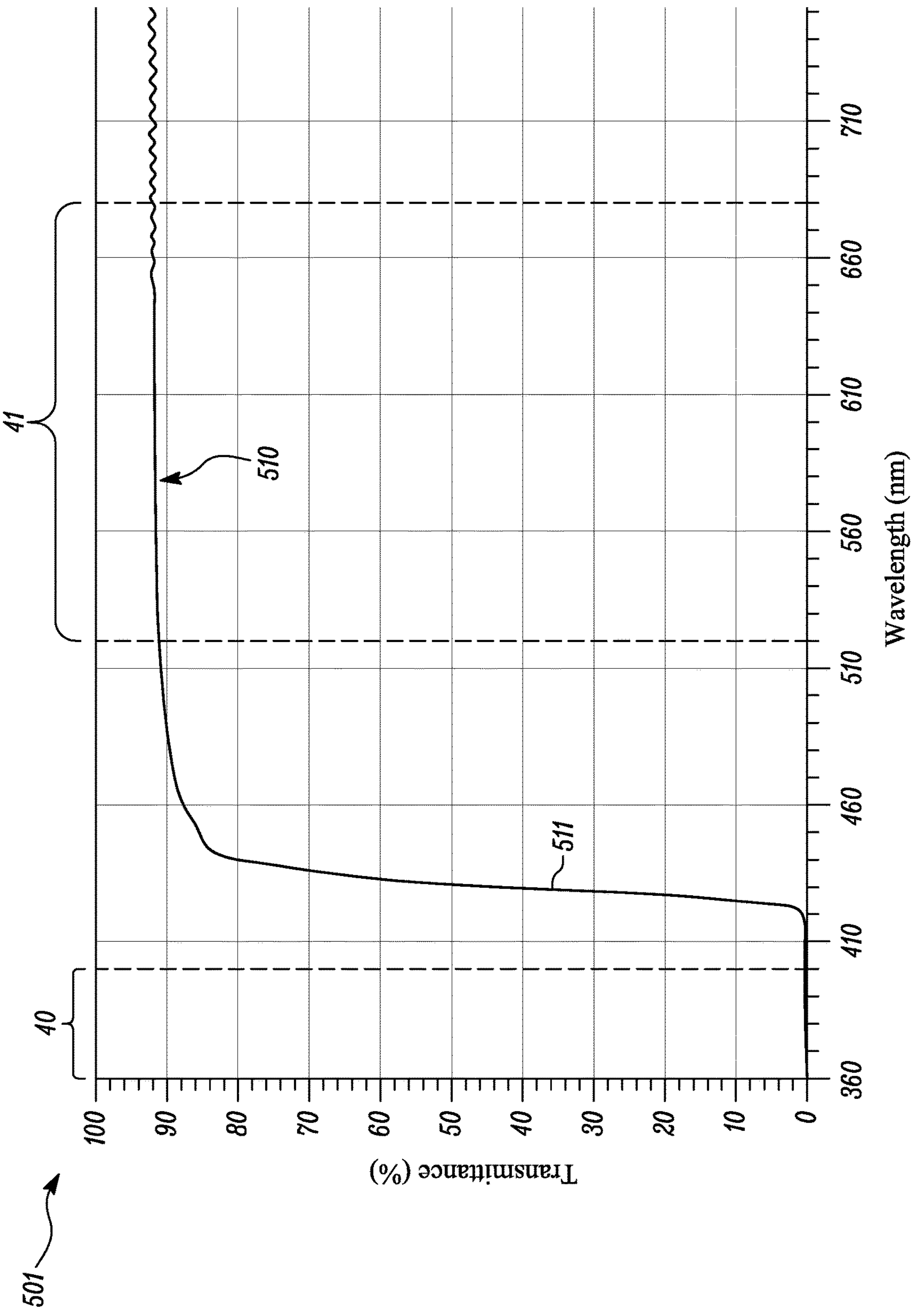
FIG. 5A illustrates a graph depicting optical transmittance versus wavelength, for substantially normal incidence, of the optical film of FIG. 2, in accordance with another embodiment of the present disclosure.

FIG. 5A illustrates a graph 501 depicting optical transmittance versus wavelength of the optical film 200 (shown in FIG. 2), according to another embodiment of the present disclosure. The optical film 200 corresponding to FIG. 5A may have a different configuration from the configurations of the optical film 200 corresponding to FIGS. 3A and 4A. Wavelength is expressed in nanometers (nm) in the abscissa. Optical transmittance is expressed as a transmittance percentage in the left ordinate.

Referring now to FIGS. 2 and 5A, as shown in the graph 501, for the substantially normally incident light 20, an optical transmittance of the optical film versus wavelength 510 includes a band edge 511. The band edge 511 separates the first wavelength range 40 including at least wavelengths from about 360 nm to about 400 nm from the second wavelength range 41 including at least wavelengths from about 520 nm to about 680 nm. The optical transmittance of the optical film versus wavelength 510 is interchangeably referred to as "the optical transmittance versus wavelength 510". The optical transmittance versus wavelength 510 therefore illustrates a variation of the optical transmittance of the optical film 200 with wavelength for the substantially normally incident light 20.

Referring to the optical transmittance versus wavelength 510 in the graph 501, in some embodiments, for the substantially normally incident light 20, the optical film 200 has an average optical transmittance of less than about 15% in the first wavelength range 40. In some embodiments, for the substantially normally incident light 20, the optical film 200 has the average optical transmittance of less than about 10%, less than about 5%, less than about 2.5%, less than about 1.5%, or less than about 1% in the first wavelength range 40.

Referring to the optical transmittance versus wavelength 510 in the graph 501, in some embodiments, for the substantially normally incident light 20, the optical film 200 has an average optical transmittance of greater than about 70% in the second wavelength range 41. In some embodiments, for the substantially normally incident light 20, the optical film 200 has the average optical transmittance of greater than about 75%, greater than about 80%, or greater than about 85% in the second wavelength range 41.

In some embodiments, the band edge 511 also separates a wavelength range including at least wavelengths from about 360 nm to about 370 nm from another wavelength range including at least wavelengths from about 450 nm to about 680 nm. In some embodiments, for the substantially normally incident light 20, the optical film 200 has an average optical transmittance of less than about 15% for the wavelength range including at least wavelengths from about 360 nm to about 370 nm. In some embodiments, for the substantially normally incident light 20, the optical film 200 has an average optical transmittance of greater than about 70% for the wavelength range including at least wavelengths from about 450 nm to about 680 nm.

Referring to the optical transmittance versus wavelength 510 in the graph 501, in some embodiments, the optical film 200 has a 50% optical transmittance along the band edge 511 at a wavelength of between about 400 nm and about 530 nm. In some embodiments, the optical film 200 has a 50% optical transmittance along the band edge 511 at a wavelength of between about 415 nm and about 445 nm.

Referring to the graphs 301, 501 shown in FIGS. 3A, 5A, respectively, for substantially normal incidence, the band edge 511 of the optical transmittance versus wavelength 510 is disposed nearer to the first wavelength range 40 as compared to the band edge 31 of the optical transmittance versus wavelength 30. Referring to the optical transmittance versus wavelength 510, the optical film 200 has an average optical transmittance of greater than about 70% in a wavelength range from about 440 nm to about 500 nm. Referring to the optical transmittance versus wavelength 30, the optical film 200 has an average optical transmittance of less than about 15% in the wavelength range from about 440 nm to about 500 nm. Therefore, in the wavelength range from about 440 nm to about 500 nm, the optical film 200 having the configuration corresponding to FIG. 5A may have a relatively higher optical transmittance than the optical film 200 having the configuration corresponding to FIG. 3A. Hence, a configuration of the optical film 200 may be varied to obtain different optical characteristics based on desired application attributes.

Figure 5B:
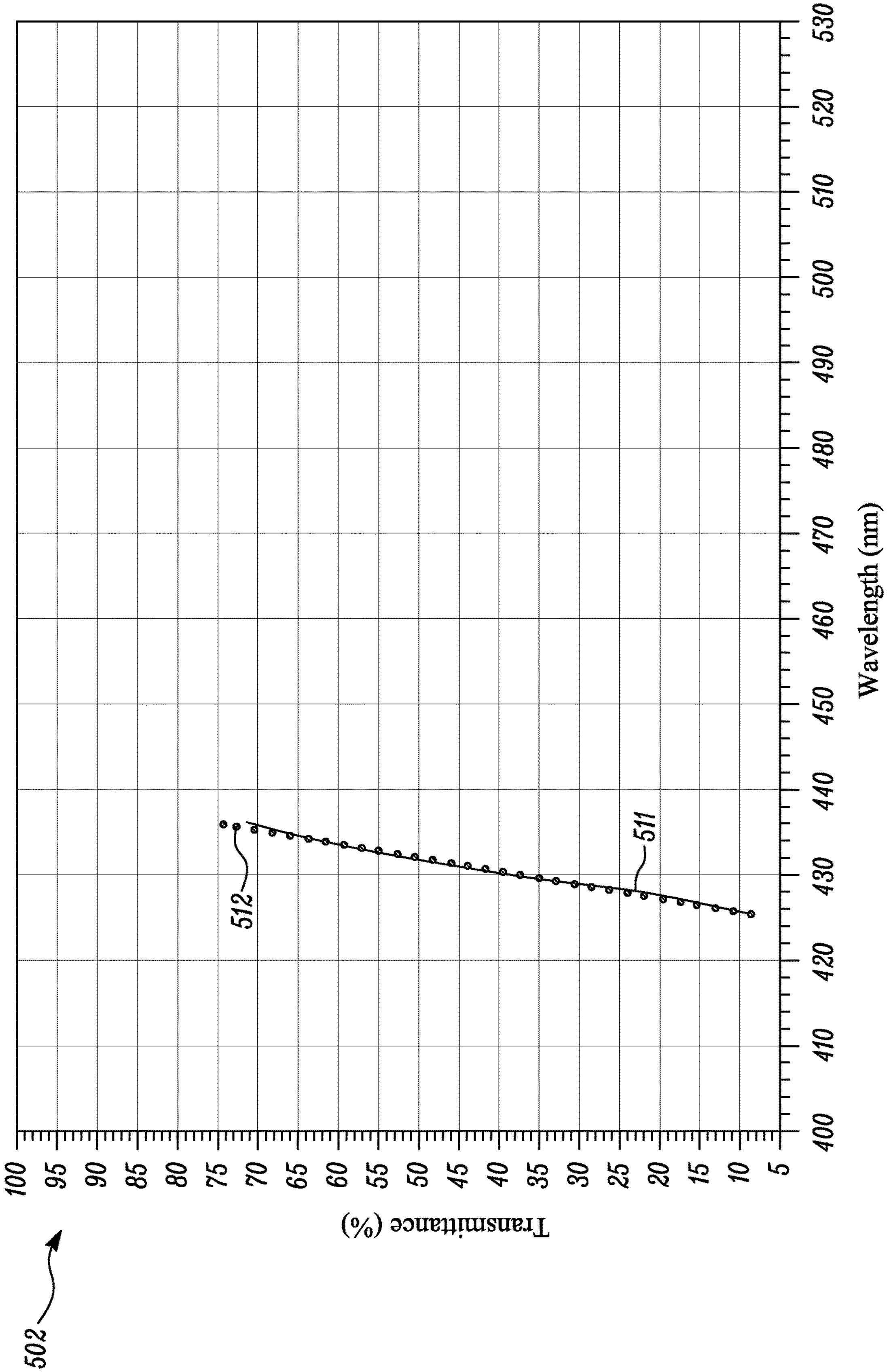
FIG. 5B illustrates a graph depicting a best linear fit of a band edge of the optical transmittance versus wavelength depicted in FIG. 5A, in accordance with an embodiment of the present disclosure.

FIG. 5B illustrates a graph 502 depicting a best linear fit 512 to the band edge 511 (also shown in FIG. 5A) of the optical transmittance versus wavelength 510 of the optical film 200 (shown in FIG. 2), according to an embodiment of the present disclosure. The band edge 511 correlates the optical transmittance to the wavelength at least across a wavelength range where the optical transmittance increases from about 10% to at least about 70%. The best linear fit 512 to the band edge 511 has a slope S3 and a r-squared value R3. In some embodiments, the best linear fit 512 to the band edge 511 correlating the optical transmittance to the wavelength at least across the wavelength range where the optical transmittance along the band edge 511 increases from about 10% to at least about 70% has the slope S3 greater than about 3%/nm. In some embodiments, the band edge 511 correlates the optical transmittance to the wavelength at least across a wavelength range from about 425 nm to about 440 nm where the optical transmittance increases from about 10% to at least about 70%. In some embodiments, the best linear fit 512 has the slope S3 greater than about 3.5%/nm, greater than about 4%/nm, greater than about 4.5%/nm, greater than about 5%/nm, or greater than about 5.5%/nm.

The best linear fit 512 is according to Equation 3 provided below, $$y=5.8971x-2503.4 \quad \text{(Equation 3)}$$

In Equation 3, "y" denotes the average optical transmittance of the optical film 200 for the substantially normally incident light 20, and "x" denotes the wavelength. Further, S3=5.8971; and R3=0.9927.

Figure 5C:
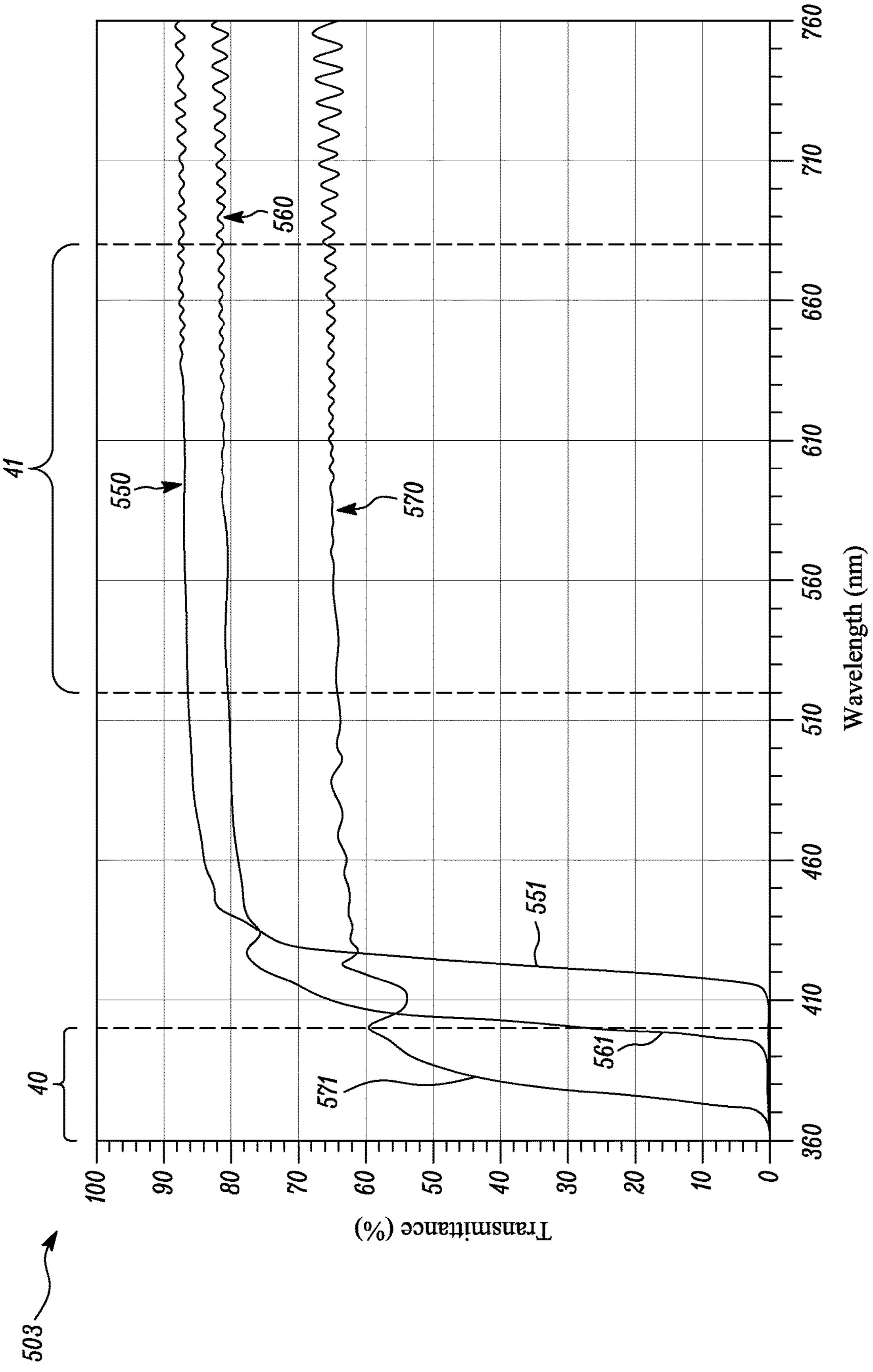
FIG. 5C illustrates a graph depicting optical transmittances versus wavelength, for different incident angles, of the optical film having a similar configuration as that of the optical film corresponding to FIG. 5A, in accordance with an embodiment of the present disclosure.

FIG. 5C illustrates a graph 503 depicting optical transmittance versus wavelength of the optical film 200 (shown in FIG. 2), according to another embodiment of the present disclosure. A configuration of the optical film 200 corresponding to FIG. 5C may be substantially similar to the configuration of the optical film 200 corresponding to FIG. 5A. Wavelength is expressed in nanometers (nm) in the abscissa. Optical transmittance is expressed as a transmittance percentage in the left ordinate.

Referring to FIGS. 2 and 5C, for the incident light 25 incident at the incident angle θ of about 20 degrees, the graph 503 depicts an optical transmittance of the optical film versus wavelength 550. The optical transmittance of the optical film versus wavelength 550 is interchangeably referred to as "the optical transmittance versus wavelength 550". The optical transmittance versus wavelength 550 therefore illustrates a variation of the optical transmittance of the optical film 200 with wavelength for the incident light 25 incident at the incident angle θ of about 20 degrees.

The optical transmittance versus wavelength 550 includes a band edge 551 separating the first wavelength range 40 including at least wavelengths from about 360 nm to about 400 nm from the second wavelength range 41 including at least wavelengths from about 520 nm to about 680 nm. In some embodiments, the band edge 551 further separates a wavelength range including at least wavelengths from about 360 nm to about 410 nm from another wavelength range including at least wavelengths from about 460 nm to about 680 nm. Further, in some embodiments, the band edge 551 correlates the optical transmittance to the wavelength at least across a wavelength range from about 420 nm to about 435 nm where the optical transmittance increases from about 10% to at least about 70%.

Referring to FIGS. 2 and 5C, for the incident light 25 incident at the incident angle θ of about 40 degrees, the graph 503 depicts an optical transmittance of the optical film versus wavelength 560. The optical transmittance of the optical film versus wavelength 560 is interchangeably referred to as "the optical transmittance versus wavelength 560". The optical transmittance versus wavelength 560 therefore illustrates a variation of the optical transmittance of the optical film 200 with wavelength for the incident light 25 incident at the incident angle θ of about 40 degrees.

The optical transmittance versus wavelength 560 includes a band edge 561 separating a wavelength range including at least wavelengths from about 360 nm to about 390 nm from the second wavelength range 41 including at least wavelengths from about 520 nm to about 680 nm. In some embodiments, the band edge 561 further separates the wavelength range including at least wavelengths from about 360 nm to about 390 nm from another wavelength range including at least wavelengths from about 450 nm to about 680 nm. Further, in some embodiments, the band edge 561 correlates the optical transmittance to the wavelength at least across a wavelength range from about 395 nm to about 420 nm where the optical transmittance increases from about 10% to at least about 70%.

Referring again to FIGS. 2 and 5C, for the incident light 25 incident at the incident angle θ of about 60 degrees, the graph 503 depicts an optical transmittance of the optical film versus wavelength 570. The optical transmittance of the optical film versus wavelength 570 is interchangeably referred to as "the optical transmittance versus wavelength 570". The optical transmittance versus wavelength 570 therefore illustrates a variation of the optical transmittance of the optical film 200 with wavelength for the incident light 25 incident at the incident angle θ of about 60 degrees.

The optical transmittance versus wavelength 570 includes a band edge 571 separating a wavelength range including at least wavelengths from about 360 nm to about 370 nm from the second wavelength range 41 including at least wavelengths from about 520 nm to about 680 nm. In some embodiments, the band edge 571 further separates the wavelength range including at least wavelengths from about 360 nm to about 370 nm from another wavelength range including at least wavelengths from about 420 nm to about 680 nm. Further, in some embodiments, the band edge 571 correlates the optical transmittance to the wavelength at least across a wavelength range from about 375 nm to about 395 nm where the optical transmittance increases from about 10% to at least about 50%.

Referring to the optical transmittances 550, 560, 570 in the graph 503, each of the band edges 551, 561, 571 separates the wavelength range including at least wavelengths from about 360 nm to about 370 nm from the second wavelength range 41. Each of the band edges 551, 561, 571 further separates the wavelength range including at least wavelengths from about 360 nm to about 370 nm from the wavelength range including at least wavelengths from about 450 nm to about 680 nm. In some embodiments, the optical film 200 has an average optical transmittance of less than about 15% in the wavelength range including at least wavelengths from about 360 nm to about 370 nm for the incident light 25 incident at each of the incident angles of about 20 degrees, about 40 degrees, and about 60 degrees. Further, in some embodiments, the optical film 200 has an average optical transmittance of greater than about 50% in the second wavelength range 41 for the incident light 25 incident at each of the incident angles of about 20 degrees, about 40 degrees, and about 60 degrees. Additionally, in some embodiments, the optical film 200 has an average optical transmittance of greater than about 50% in the wavelength range including at least wavelengths from about 450 nm to about 680 nm for the incident light 25 incident at each of the incident angles of about 20 degrees, about 40 degrees, and about 60 degrees. Therefore, referring to the graphs 501, 503 shown in FIGS. 5A and 5C, respectively, for both a substantially normally incident light (e.g., the incident light 20 in FIG. 2) and an obliquely incident light (e.g., the incident light 25 in FIG. 2), the optical film 200 may have an average optical transmittance of less than about 15% in the wavelength range including at least wavelengths from about 360 nm to about 370 nm, and an average optical transmittance of greater than about 50% in at least the second wavelength range 41. Further, for both the substantially normally incident light and the obliquely incident light, the optical film 200 may have an average optical transmittance of greater than about 50% in the wavelength range including at least wavelengths from about 450 nm to about 680 nm.

Figure 6A:
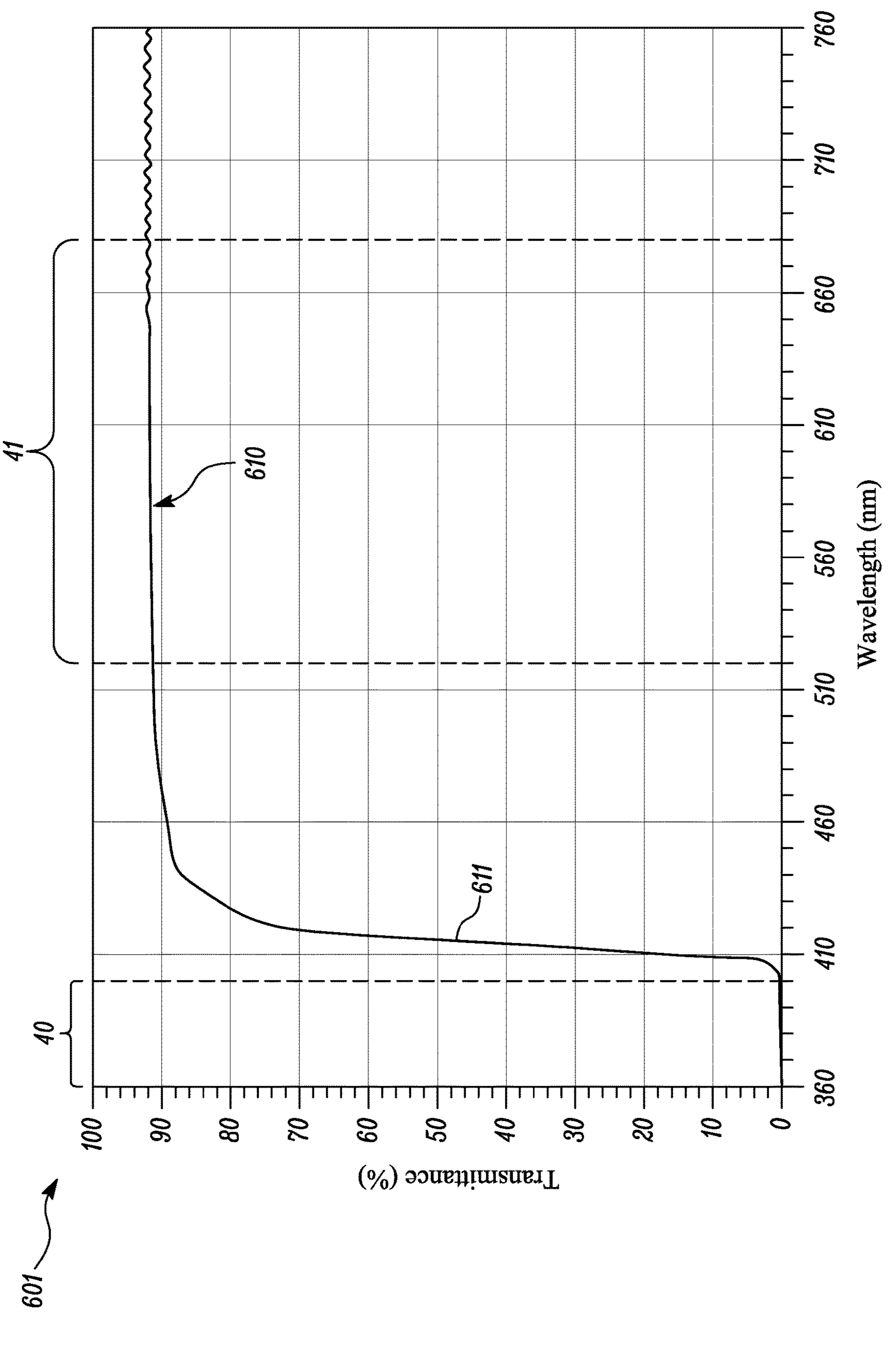
FIG. 6A illustrates a graph depicting optical transmittance versus wavelength, for substantially normal incidence, of the optical film of FIG. 2, in accordance with another embodiment of the present disclosure.

FIG. 6A illustrates a graph 601 depicting optical transmittance versus wavelength of the optical film 200 (shown in FIG. 2), according to another embodiment of the present disclosure. The optical film 200 corresponding to FIG. 6A may have a different configuration from the configurations of the optical film 200 corresponding to FIGS. 3A, 4A and 5A. Wavelength is expressed in nanometers (nm) in the abscissa. Optical transmittance is expressed as a transmittance percentage in the left ordinate.

Referring now to FIGS. 2 and 6A, as shown in the graph 601, for the substantially normally incident light 20, an optical transmittance of the optical film versus wavelength 610 includes a band edge 611. The band edge 611 separates the first wavelength range 40 including at least wavelengths from about 360 nm to about 400 nm from the second wavelength range 41 including at least wavelengths from about 520 nm to about 680 nm. The optical transmittance of the optical film versus wavelength 610 is interchangeably referred to as "the optical transmittance versus wavelength 610". The optical transmittance versus wavelength 610 therefore illustrates a variation of the optical transmittance of the optical film 200 with wavelength for the substantially normally incident light 20.

Referring to the optical transmittance versus wavelength 610 in the graph 601, in some embodiments, for the substantially normally incident light 20, the optical film 200 has an average optical transmittance of less than about 15% in the first wavelength range 40. In some embodiments, for the substantially normally incident light 20, the optical film 200 has the average optical transmittance of less than about 10%, less than about 5%, less than about 2.5%, less than about 1.5%, or less than about 1% in the first wavelength range 40.

Referring to the optical transmittance versus wavelength 610 in the graph 601, in some embodiments, for the substantially normally incident light 20, the optical film 200 has an average optical transmittance of greater than about 70% in the second wavelength range 41. In some embodiments, for the substantially normally incident light 20, the optical film 200 has the average optical transmittance of greater than about 75%, greater than about 80%, or greater than about 85% in the second wavelength range 41.

In some embodiments, the band edge 611 is located such that, for the substantially normally incident light 20, the optical film 200 has an average optical transmittance of greater than about 70% for the wavelength range including at least wavelengths from about 450 nm to about 680 nm.

Referring to the optical transmittance versus wavelength 610 in the graph 601, in some embodiments, the optical film 200 has a 50% optical transmittance along the band edge 611 at a wavelength of between about 400 nm and about 530 nm. In some embodiments, the optical film 200 has a 50% optical transmittance along the band edge 611 at a wavelength of between about 400 nm and about 430 nm.

Referring to the graphs 301, 601 shown in FIGS. 3A, 6A, respectively, for substantially normal incidence, the band edge 611 of the optical transmittance versus wavelength 610 is disposed nearer to the first wavelength range 40 as compared to the band edge 31 of the optical transmittance versus wavelength 30. Referring to the optical transmittance versus wavelength 610, the optical film 200 has an average optical transmittance of greater than about 70% in a wavelength range from about 420 nm to about 500 nm. Referring to the optical transmittance versus wavelength 30, the optical film 200 has an average optical transmittance of less than about 15% in the wavelength range from about 420 nm to about 500 nm. Therefore, in the wavelength range from about 420 nm to about 500 nm, the optical film 200 having the configuration corresponding to FIG. 6A may have a relatively higher optical transmittance than the optical film 200 having the configuration corresponding to FIG. 3A. Hence, a configuration of the optical film 200 may be varied to obtain different optical characteristics based on desired application attributes.

Figure 6B:
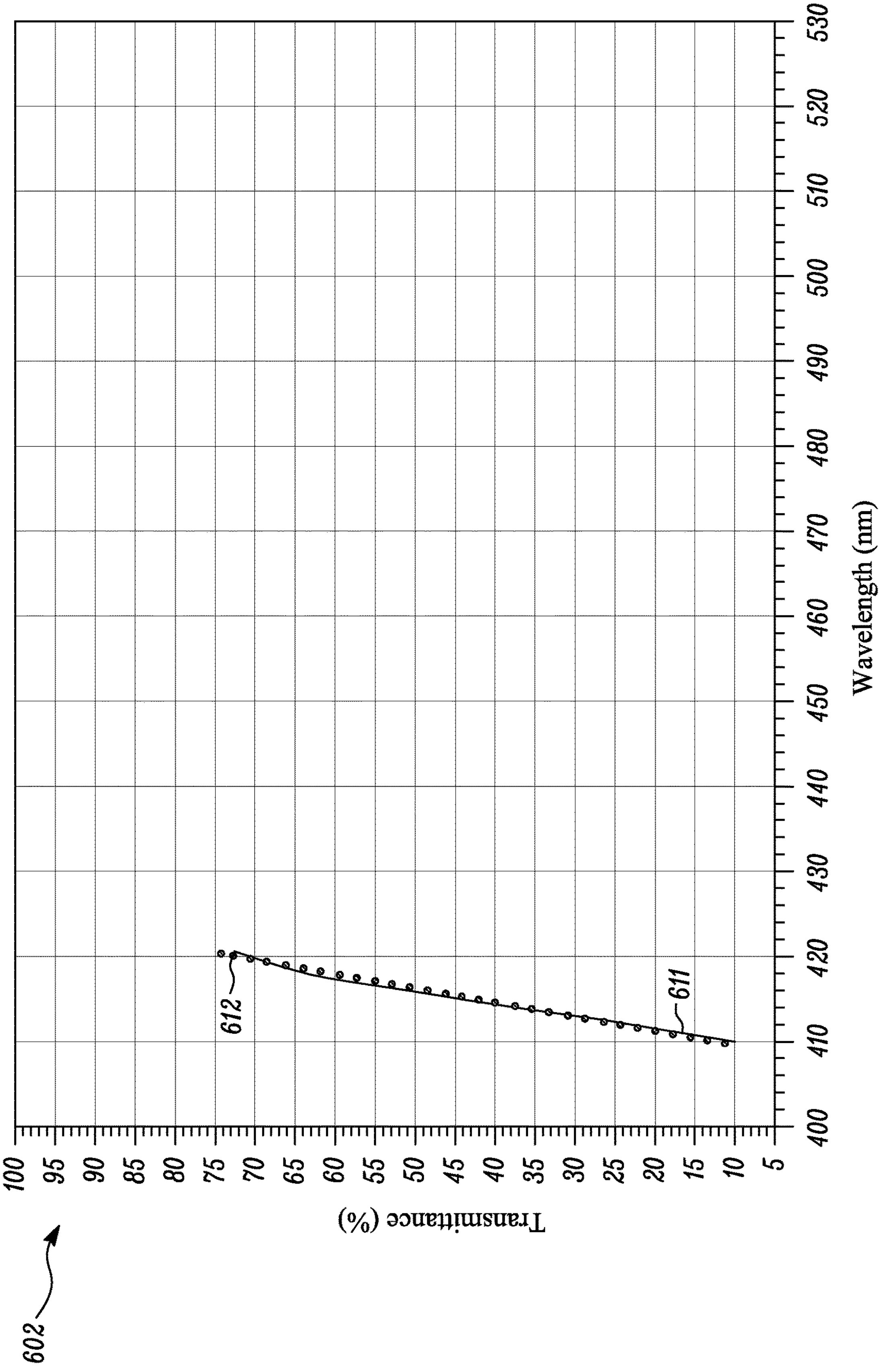
FIG. 6B illustrates a graph depicting a best linear fit of a band edge of the optical transmittance versus wavelength depicted in FIG. 6A, in accordance with an embodiment of the present disclosure.

FIG. 6B illustrates a graph 602 depicting a best linear fit 612 to the band edge 611 (also shown in FIG. 6A) of the optical transmittance versus wavelength 610 of the optical film 200 (shown in FIG. 2), according to an embodiment of the present disclosure. The band edge 611 correlates the optical transmittance to the wavelength at least across a wavelength range where the optical transmittance increases from about 10% to at least about 70%. The best linear fit 612 to the band edge 611 has a slope S4 and a r-squared value R4. In some embodiments, the best linear fit 612 to the band edge 611 correlating the optical transmittance to the wavelength at least across the wavelength range where the optical transmittance along the band edge 611 increases from about 10% to at least about 70% has the slope S4 greater than about 3%/nm. In some embodiments, the band edge 611 correlates the optical transmittance to the wavelength at least across a wavelength range from about 410 nm to about 425 nm where the optical transmittance increases from about 10% to at least about 70%. In some embodiments, the best linear fit 612 has the slope S4 greater than about 3.5%/nm, greater than about 4%/nm, greater than about 4.5%/nm, greater than about 5%/nm, or greater than about 5.5%/nm.

The best linear fit 612 is according to Equation 4 provided below, $$y=5.8603x-2391.6 \qquad \text{(Equation 4)}$$

In Equation 4, "y" denotes the average optical transmittance of the optical film 200 for the substantially normally incident light 20, and "x" denotes the wavelength. Further, S4=5.8603; and R4=0.9884.

Figure 6C:
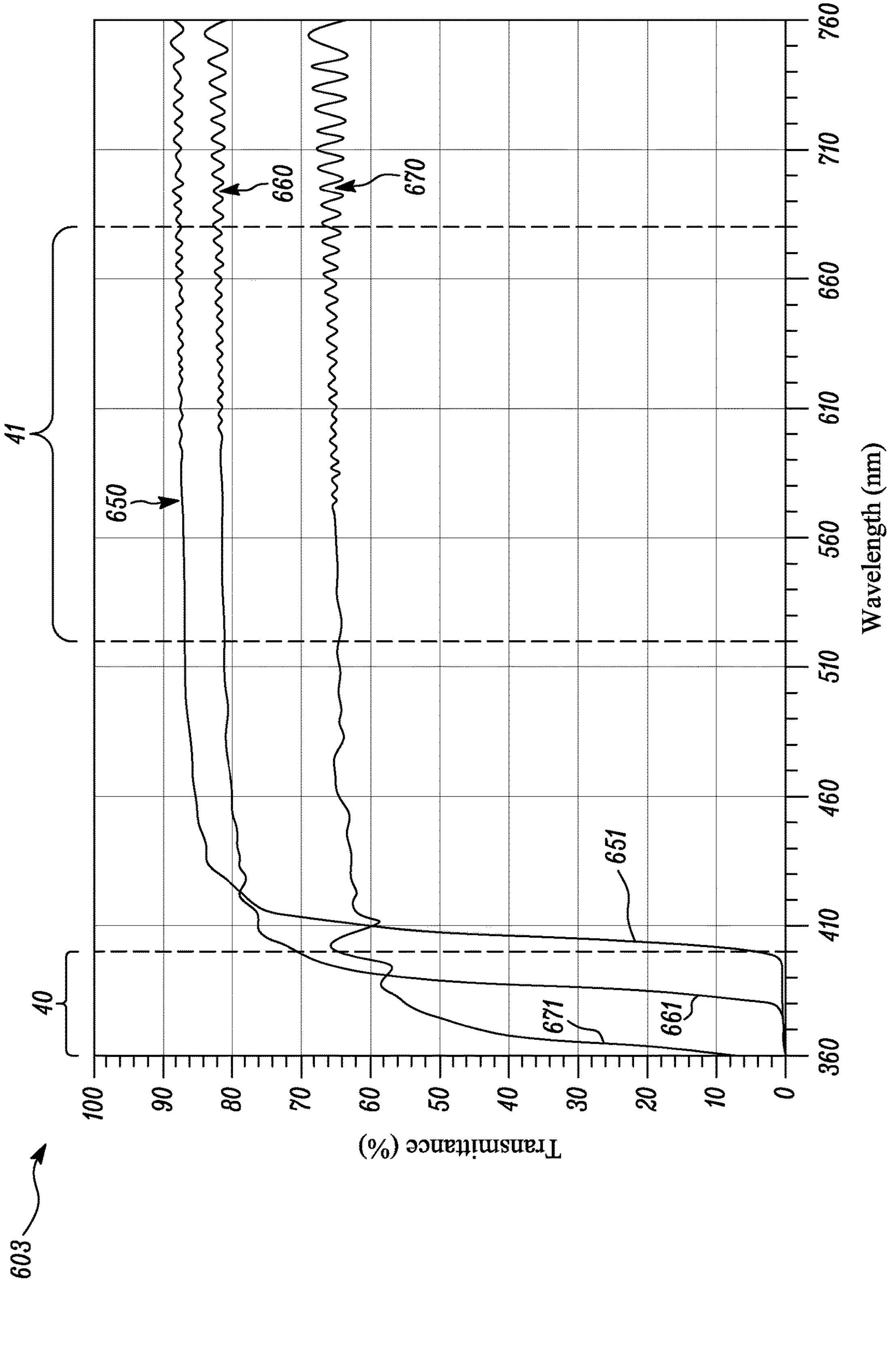
FIG. 6C illustrates a graph depicting optical transmittances versus wavelength, for different incident angles, of the optical film having a similar configuration as that of the optical film corresponding to FIG. 6A, in accordance with an embodiment of the present disclosure.

FIG. 6C illustrates a graph 603 depicting optical transmittance versus wavelength of the optical film 200 (shown in FIG. 2), according to another embodiment of the present disclosure. A configuration of the optical film 200 corresponding to FIG. 6C may be substantially similar to the configuration of the optical film 200 corresponding to FIG. 6A. Wavelength is expressed in nanometers (nm) in the abscissa. Optical transmittance is expressed as a transmittance percentage in the left ordinate.

Referring to FIGS. 2 and 6C, for the incident light 25 incident at the incident angle θ of about 20 degrees, the graph 603 depicts an optical transmittance of the optical film versus wavelength 650. The optical transmittance of the optical film versus wavelength 650 is interchangeably referred to as "the optical transmittance versus wavelength 650". The optical transmittance versus wavelength 650 therefore illustrates a variation of the optical transmittance of the optical film 200 with wavelength for the incident light 25 incident at the incident angle θ of about 20 degrees.

The optical transmittance versus wavelength 650 includes a band edge 651 separating a wavelength range including at least wavelengths from about 360 nm to about 390 nm from the second wavelength range 41 including at least wavelengths from about 520 nm to about 680 nm. In some embodiments, the band edge 651 further separates the wavelength range including at least wavelengths from about 360 nm to about 390 nm from another wavelength range including at least wavelengths from about 450 nm to about 680 nm. Further, in some embodiments, the band edge 651 correlates the optical transmittance to the wavelength at least across a wavelength range from about 400 nm to about 420 nm where the optical transmittance increases from about 10% to at least about 70%.

Referring to FIGS. 2 and 6C, for the incident light 25 incident at the incident angle θ of about 40 degrees, the graph 603 depicts an optical transmittance of the optical film versus wavelength 660. The optical transmittance of the optical film versus wavelength 660 is interchangeably referred to as "the optical transmittance versus wavelength 660". The optical transmittance versus wavelength 660 therefore illustrates a variation of the optical transmittance of the optical film 200 with wavelength for the incident light 25 incident at the incident angle θ of about 40 degrees.

The optical transmittance versus wavelength 660 includes a band edge 661 separating a wavelength range including at least wavelengths from about 360 nm to about 380 nm from the second wavelength range 41 including at least wavelengths from about 520 nm to about 680 nm. In some embodiments, the band edge 661 further separates the wavelength range including at least wavelengths from about 360 nm to about 380 nm from the wavelength range including at least wavelengths from about 450 nm to about 680 nm. Further, in some embodiments, the band edge 661 correlates the optical transmittance to the wavelength at least across a wavelength range from about 380 nm to about 405 nm where the optical transmittance increases from about 10% to at least about 70%.

Referring again to FIGS. 2 and 6C, for the incident light 25 incident at the incident angle θ of about 60 degrees, the graph 603 depicts an optical transmittance of the optical film versus wavelength 670. The optical transmittance of the optical film versus wavelength 670 is interchangeably referred to as "the optical transmittance versus wavelength 670". The optical transmittance versus wavelength 670 therefore illustrates a variation of the optical transmittance of the optical film 200 with wavelength for the incident light 25 incident at the incident angle θ of about 60 degrees.

The optical transmittance versus wavelength 670 includes a band edge 671 correlating the optical transmittance to the wavelength at least across a wavelength range from about 360 nm to about 380 nm where the optical transmittance increases from about 10% to at least about 50%.

Referring to the optical transmittances 650, 660, 670 in the graph 603, each of the band edges 651, 661, 671 are located such that, in some embodiments, the optical film 200 has an average optical transmittance of greater than about 50% in the wavelength range including at least wavelengths from about 450 nm to about 680 nm for the incident light 25 incident at each of the incident angles of about 20 degrees, about 40 degrees, and about 60 degrees. Therefore, referring to the graphs 601, 603 shown in FIGS. 6A and 6C, respectively, for both a substantially normally incident light (e.g., the incident light 20 in FIG. 2) and an obliquely incident light (e.g., the incident light 25 in FIG. 2), the optical film

200 may have an average optical transmittance of greater than 50% in the wavelength range including at least wavelengths from about 450 nm to about 680 nm.

Referring to FIGS. 3A to 6C, in some embodiments, the optical film 200 has a 50% optical transmittance along the band edge 31, 410, 510, or 610 at a wavelength of between one of about 400 nm and about 430 nm, about 415 nm and about 445 nm, about 435 nm and about 465 nm, and about 500 nm and about 530 nm. Specifically, referring to FIG. 6A, in some embodiments, the optical film 200 has a 50% optical transmittance along the band edge 611 at a wavelength of between about 400 nm and about 430 nm. Further, referring to FIG. 5A, in some embodiments, the optical film 200 has a 50% optical transmittance along the band edge 511 at a wavelength of between about 415 nm and about 445 nm. Moreover, referring to FIG. 4A, in some embodiments, the optical film 200 has a 50% optical transmittance along the band edge 411 at a wavelength of between about 435 nm and about 465 nm. Additionally, referring to FIG. 3A, in some embodiments, the optical film 200 has a 50% optical transmittance along the band edge 31 at a wavelength of between about 500 nm and about 530 nm.

Referring to FIGS. 1-6C, the optical film 200 may have a relatively low optical transmittance for a substantially normally incident light in a wavelength range from about 360 nm to about 400 nm. The package 300 including the optical film 200 may therefore have an overall low transmittance for UV light having wavelengths from about 360 nm to about 400 nm. This may protect the light sensitive material 310 from detrimental effects of exposure to UV light. Such detrimental effects may include photo-degradation that may otherwise cause an irreversible change in chemical properties of the light sensitive material 310.

In some embodiments, the optical film 200 may be a partial mirror, such that the optical characteristics shown in FIGS. 3A-6C correspond to each of a first polarization state (e.g., p-polarized state) and an orthogonal second polarization state (e.g., s-polarization state). In some cases, the first polarization state may be along the x-axis, and the second polarization state may be along the y-axis. In some other embodiments, the optical film 200 may be polarization sensitive, such that the optical characteristics shown in FIGS. 3A-6C correspond to one of the first and second polarization states. For example, the optical characteristics of the optical film 200 shown in FIGS. 3A-6C may correspond to the first polarization state. The optical film 200 may be substantially reflective for the other one of the first and second polarization states, for example, the second polarization state. In some cases, the optical film 200 may act as a broadband reflector for the second polarization state and may substantially reflect UV light in the second polarization state.

Further, the optical transmittances versus wavelength 30, 410, 510, 610 (shown in FIGS. 3A, 4A, 5A, 6A) of the optical film 200 includes the band edges 31, 411, 511, 611, respectively, that are relatively sharp (e.g., having a slope of at least 3%/nm in the corresponding best linear fits) as compared to conventional films. Each of the band edges 31, 411, 511, 611 may separate the UV wavelength range (from about 360 nm to about 400 nm) from a substantial portion (e.g., from about 520 nm to about 680 nm) of the visible wavelength range, such that the optical film 200 may substantially block UV light, while substantially transmitting at least some wavelengths of visible light. Therefore, the optical film 200 has a relatively high transmittance for green light and red light. Hence, due to the sharpness of the band edges 31, 411, 511, 611 of the optical transmittances versus wavelength 30, 410, 510, 610, respectively, the package 300 may substantially transmit visible light through the optical film 200, thus enabling the package 300 to be substantially color neutral. Thus, the package 300 including the optical film 200 may be substantially optically clear without any undesirable color shift.

Further, referring to FIG. 3C, the optical transmittances versus wavelength 350, 360, 370 for the optical film 200 includes the band edges 351, 361, 371, respectively, that are relatively sharp even at different oblique angles of incidence (e.g., 20 degrees, 40 degrees, and 60 degrees). Each of the band edges 351, 361, 371 may separate the UV wavelength range from the substantial portion (e.g., from about 520 nm to about 680 nm) of the visible wavelength range, such that the optical film 200 may substantially block UV light, while substantially transmitting at least some wavelengths of visible light. Thus, the optical film 200 may substantially block UV light and substantially transmit at least some wavelengths of visible light for different oblique incident angles (e.g., from about 20 degrees to about 60 degrees) of the incident light 25.

It may be apparent from FIGS. 3A to 6C that the band edges 31, 411, 511, 611 corresponding to substantially normal incidence may progressively shift towards a blue end of the visible light spectrum with an increase in an angle of incidence. Conventional films may tend to at least partially transmit UV light at different incident angles due to the shift in the respective band edges. Moreover, conventional films may provide substantial color shift at different incident angles due to the shift in the respective band edges. However, the sharpness of the band edges 31, 411, 511, 611 of the optical 200 of the present disclosure may ensure substantial blocking of UV light for various angles of incidence while minimizing color shift due to transmission of light through the optical film 200.

Moreover, the band edges of the respective optical transmittances versus wavelength (shown in FIG. 3A to FIG. 6C) for the optical film 200 may separate any two suitable wavelength ranges, such that the optical film 200 may substantially block light in one of the two wavelength ranges, and substantially transmit the light in the other of the two wavelength ranges. Thus, the optical film 200 may be suitably configured based on various desired application attributes. Further, the package 300 may also include a suitable configuration of the optical film 200 based on the properties of the light sensitive material 310 disposed therein.

The package 300 of the present disclosure may be implemented in various applications, such as drug and chemical storage, food storage, or any other application requiring substantial blocking of UV light with substantial transmittance of visible light. Further, the optical film 200 of the present disclosure may be implemented in various non-packaging applications, such as eyeglasses, visors, displays of electronic devices, windows, etc.

Figure 7:
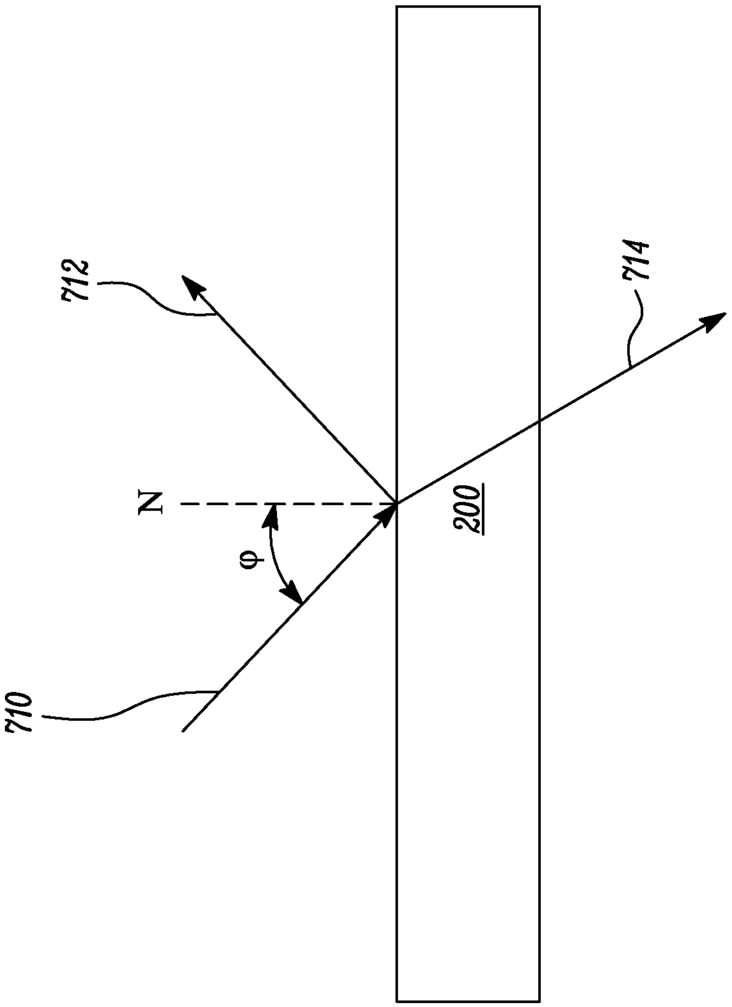
FIG. 7 illustrates a schematic view of the optical film, in accordance with an embodiment of the present disclosure.

FIG. 7 illustrates a schematic view of the optical film 200, according to an embodiment of the present disclosure. As shown in FIG. 7, the optical film 200 is irradiated with an incident light 710 at an incident angle φ with respect to the normal N. In some embodiments, the incident light 710 may be incident substantially normally on the optical film 200. In other words, the incident light 710 may be propagating substantially parallel to the normal N, i.e., the incident angle φ of the incident light 710 may be less than about 5 degrees with respect to the normal N. In some other embodiments, the incident light 710 may be obliquely incident on the optical film 200. In some embodiments, the incident angle φ of the incident light 710 may be about 40 degrees with respect to the normal N.

In some embodiments, the optical film 200 may reflect at least a first portion of the incident light 710 as a reflected light 712. Further, the optical film 200 may transmit at least a second portion of the incident light 710 as a transmitted light 714. In some cases, at least the first portion of incident light 710 may substantially undergo specular reflection, thereby resulting in the reflected light 712. The reflected light 712, due to specular reflection, may therefore conform to the law of reflection. Thus, the reflected light 712 may have a reflection angle that is approximately equal to the incident angle φ.

In some embodiments, the incident light 710 may be from an illuminant D65. Illuminant D65, or CIE Standard Illuminant D65 is a commonly used standard illuminant defined by the International Commission on Illumination (CIE). It is part of a D series of illuminants that try to portray standard illumination conditions at open-air in different parts of the world. D65 corresponds roughly to the average midday light in Western Europe/Northern Europe and includes both direct sunlight and the light diffused by a clear sky. It is hence also referred to as a daylight illuminant. Further, the CIE positions D65 as the standard daylight illuminant.

A standard illuminant is represented as a table of averaged spectrophotometric data. Hence, any light source which statistically has the same relative spectral power distribution (SPD) as the defined Illuminant D65 can be considered a D65 light source.

According to the CIE Standard Illuminants for Colorimetry, D65 is intended to represent average daylight and has a correlated color temperature of approximately 6500 K. CIE standard illuminant D65 are generally used in all colorimetric calculations requiring representative daylight, unless there are specific reasons for using a different illuminant. Further, the illuminant D65 light is considered to be white light in the CIE Lab color space.

The CIE Lab color space, also referred to as L*a*b*, is a color space defined by the CIE. It expresses color as three values: L* for perceptual lightness; and a* and b* for the four unique colors of human vision: red, green, blue, and yellow. CIE Lab is intended as a perceptually uniform space, where a given numerical change corresponds to similar perceived change in color. While the CIE Lab color space is not truly perceptually uniform, it nevertheless is useful in industry for detecting small differences in color.

The CIE Lab color space is a device-independent, "standard observer" model. The CIE Lab color space may also be referred to as "the CIELAB color space". The colors defined by CIE Lab color space are not relative to any particular device such as a computer monitor or a printer, but instead relate to the CIE standard observer which is an averaging of the results of color matching experiments under laboratory conditions.

The CIE Lab color space is three-dimensional, and covers the entire range of human color perception, or gamut. It is based on the opponent color model of human vision, where red/green forms an opponent pair, and blue/yellow forms an opponent pair. The lightness value L* defines black at 0 and white at 100. The a* axis is relative to the green-red opponent colors, with negative values toward green and positive values toward red. The b* axis represents the blue-yellow opponents, with negative numbers toward blue and positive toward yellow.

Referring to FIG. 7, for the incident light 710 incident on the optical film 200 from an illuminant D65, the optical film 200 reflects the incident light 710 with the reflected light 712, in a CIE Lab Color Space, having a first colorimetric parameter a1* for the incident angle φ of less than about 5 degrees and a second colorimetric parameter a2* for the incident angle φ of about 40 degrees, a magnitude of a difference between a1* and a2* is less than about 25. In some embodiments, the magnitude of the difference between a1* and a2* is less than about 20, less than about 15, less than about 10, less than about 5, or less than about 2.

In other words, for the incident light 710 having the incident angle φ less than about 5 degrees, the reflected light 712 may have the first colorimetric value a1*. Further, for the incident light 710 having the incident angle φ of about 40 degrees, the reflected light 712 may have the second colorimetric value a2*. In some embodiments, the magnitude of the difference between the first and second colorimetric values a1*, a2* may be less than about 25, less than about 20, less than about 15, less than about 10, less than about 5, or less than about 2. In other words, the reflected light 712 due to the incident light 710 having the incident angle φ less than about 5 degrees, and the reflected light 712 due to the incident light 710 having the incident angle φ of about 40 degrees may have a variation in green-red opponent colors of less than about 25, less than about 20, less than about 15, less than about 10, less than about 5, or less than about 2. Therefore, the reflected light 712 due to the incident light 710 having the incident angle φ less than about 5 degrees, and the reflected light 712 due to the incident light 710 having the incident angle φ of about 40 degrees may have a low variation in green-red opponent colors.

Similarly, for the incident light 710 incident on the optical film 200 from an illuminant D65, the optical film 200 reflects the incident light 710 with the reflected light 712, in a CIE Lab Color Space, having a first colorimetric parameter b1* for the incident angle φ of less than about 5 degrees and a second colorimetric parameter b2* for the incident angle φ of about 40 degrees, a magnitude of a difference between b1* and b2* is less than about 55. In some embodiments, the magnitude of the difference between b1* and b2* is less than about 50, less than about 45, less than about 40, less than about 35, less than about 30, less than about 25, less than about 20, less than about 15, less than about 10, less than about 5, or less than about 3.

In other words, for the incident light 710 having the incident angle φ less than about 5 degrees, the reflected light 712 may have the first colorimetric value b1*. Further, for the incident light 710 having the incident angle φ of about 40 degrees, the reflected light 712 may have the second colorimetric value b2*. In some embodiments, the magnitude of the difference between the first and second colorimetric values b1*, b2* may be less than about 55, less than about 50, less than about 45, less than about 40, less than about 35, less than about 30, less than about 25, less than about 20, less than about 15, less than about 10, less than about 5, or less than about 3. In other words, the reflected light 712 due to the incident light 710 having the incident angle φ less than about 5 degrees, and the reflected light 712 due to the incident light 710 having the incident angle φ of about 40 degrees may have a variation in blue-yellow opponent colors of less than about 50, less than about 45, less than about 40, less than about 35, less than about 30, less than about 25, less than about 20, less than about 15, less than about 10, less than about 5, or less than about 3. Therefore, the reflected light 712 due to the incident light 710 having the incident angle φ less than about 5 degrees, and the reflected light 712 due to the incident light 710 having the incident angle φ of about 40 degrees may have a low variation in blue-yellow opponent colors.

Both the magnitude of the difference between a1*, a2* and the magnitude of the difference between b1*, b2* may be relatively low as compared to conventional films. The optical film 200 may provide low color shifts in the reflected light 712 corresponding to changes in the incident angle of the incident light 710 along both the a* axis and the b* axis in the CIE Lab color space. Hence, the reflection light 712 due to the incident light 710 may have a low variation in perceived color for different incident angles (e.g., substantially normal incidence and about 40 degrees) of the incident light 710. The optical film 200 may therefore minimize a color shift due to change in viewing angles. Thus, the optical film 200 of the present disclosure may allow a wider viewing angle for viewing the light sensitive material 310 (shown FIG. 1) with a limited change in perceived color of the light sensitive material 310. As a result, the package 300 including the optical film 200 may be substantially optically clear without any undesirable color shift for different viewing angles.

EXAMPLES

The disclosure is further described with reference to following experimental results. The following experimental results are offered for illustrative purposes only and are not intended to limit the scope of the disclosure.

Example 1

Table 1 below shows values of the optical transmittance of the optical film 200 having a configuration corresponding to FIG. 3A for the incident light 710, from an illuminant D65, incident at different values of the incident angle φ (shown in FIG. 7). Table 1 further shows CIE Lab colorimetric parameters a*, b* for the reflected light 712 (shown in FIG. 7) corresponding to the incident light 710 incident at different values of the incident angle φ.

Referring to Table 1, the values of the optical transmittance of the optical film 200 were calculated for the incident light 710 incident at the incident angle φ of about 0 degree (i.e., substantially normal incidence), about 20 degrees, about 40 degrees, and about 60 degrees. Further, the CIE Lab colorimetric parameters a*, b* were calculated for the reflected light 712 corresponding to the incident light 710 incident at the incident angle φ of about 0 degree, about 20 degrees, about 40 degrees, and about 60 degrees.

TABLE 1

Results of values of optical transmittance and CIE Lab colorimetric parameters

| | φ = 0 degree | φ = 20 degrees | φ = 40 degrees | φ = 60 degrees |
|---|---|---|---|---|
| Optical Transmittance (%) | 57.3 | 58.8 | 60.9 | 54.2 |
| a* | −7.7 | −15.5 | −22.6 | −11.6 |
| b* | 128 | 120.4 | 79.3 | 26.9 |

From Table 1, the CIE Lab colorimetric parameters a*, b* for the reflected light 712 corresponding to the incident light 710 incident at the incident angle φ of about 0 degree (substantially normally incident light 710) may be referred to as first colorimetric parameters a1*, b1*. The colorimetric parameters a*, b* for the reflected light 712 corresponding to the incident light 710 incident at the incident angle φ of about 20 degrees, about 40 degrees, or about 60 degrees may be referred to as second colorimetric parameters a2*, b2*.

Referring to Table 1, for the incident angle φ of about 20 degrees, about 40 degrees, or about 60 degrees, a magnitude of a difference between a1* and a2* was less than about 25. In other words, a magnitude of a difference between the values of the colorimetric parameter a* at substantially normally incidence, and at each of the oblique incident angles of about 20 degrees, about 40 degrees, and about 60 degrees was less than about 25.

Referring to Table 1, for the incident angle φ of about 20 degrees, or about 40 degrees, a magnitude of a difference between b1* and b2* was less than about 55. In other words, a magnitude of a difference between the values of the colorimetric parameter b* at substantially normal incidence, and at each of the oblique incident angles of about 20 degrees and about 40 degrees was less than about 55. However, the magnitude of a difference between the values of the colorimetric parameter b* at substantially normal incidence and at the oblique incident angle of 60 degrees is about 101.1 (i.e., greater than 55).

Example 2

Table 2 below shows values of the optical transmittance of the optical film 200 having a configuration corresponding to FIG. 4A for the incident light 710, from an illuminant D65, incident at different values of the incident angle φ (shown in FIG. 7). Table 2 further shows CIE Lab colorimetric parameters a*, b* for the reflected light 712 (shown in FIG. 7) corresponding to the incident light 710 incident at different values of the incident angle φ.

Referring to Table 2, the values of the optical transmittance of the optical film 200 were calculated for the incident light 710 incident at the incident angle φ of about 0 degree (i.e., substantially normal incidence), about 20 degrees, about 40 degrees, and about 60 degrees. Further, the CIE Lab colorimetric parameters a*, b* were calculated for the reflected light 712 corresponding to the incident light 710 incident at the incident angle φ of about 0 degree, about 20 degrees, about 40 degrees, and about 60 degrees.

TABLE 2

Results of values of optical transmittance and CIE Lab colorimetric parameters

| | φ = 0 degree | φ = 20 degrees | φ = 40 degrees | φ = 60 degrees |
|---|---|---|---|---|
| Optical Transmittance (%) | 73.7 | 74.5 | 73.6 | 62.1 |
| a* | −14.6 | −10.1 | −2.5 | −0.7 |
| b* | 33 | 21.5 | 5.7 | 2.3 |

From Table 2, the CIE Lab colorimetric parameters a*, b* for the reflected light 712 corresponding to the incident light 710 incident at the incident angle φ of about 0 degree (substantially normally incident light 710) may be referred to as first colorimetric parameters a1*, b1*. The colorimetric parameters a*, b* for the reflected light 712 corresponding to the incident light 710 incident at the incident angle φ of about 20 degrees, about 40 degrees, or about 60 degrees may be referred to as second colorimetric parameters a2*, b2*.

Referring to Table 2, for the incident angle φ of about 20 degrees, about 40 degrees, or about 60 degrees, a magnitude of a difference between a1* and a2* was less than about 25. In other words, a magnitude of a difference between the values of the colorimetric parameter a* at substantially normally incidence, and at each of the oblique incident angles of about 20 degrees, about 40 degrees, and about 60 degrees was less than about 25.

Referring to Table 2, for the incident angle φ of about 20 degrees, about 40 degrees, or about 60 degrees, a magnitude of a difference between b1* and b2* was less than about 55. In other words, a magnitude of a difference between the values of the colorimetric parameter b* at substantially normal incidence, and at each of the oblique incident angles of about 20 degrees, about 40 degrees, and about 60 degrees was less than about 55.

Example 3

Table 3 below shows values of the optical transmittance of the optical film 200 having a configuration corresponding to FIG. 5A for the incident light 710, from an illuminant D65, incident at different values of the incident angle φ (shown in FIG. 7). Table 3 further shows CIE Lab colorimetric parameters a*, b* for the reflected light 712 (shown in FIG. 7) corresponding to the incident light 710 incident at different values of the incident angle φ.

Referring to Table 3, the values of the optical transmittance of the optical film 200 were calculated for the incident light 710 incident at the incident angle φ of about 0 degree (i.e., substantially normal incidence), about 20 degrees, about 40 degrees, and about 60 degrees. Further, the CIE Lab colorimetric parameters a*, b* were calculated for the reflected light 712 corresponding to the incident light 710 incident at the incident angle φ of about 0 degree, about 20 degrees, about 40 degrees, and about 60 degrees.

TABLE 3

Results of values of optical transmittance and CIE Lab colorimetric parameters

| | φ = 0 degree | φ = 20 degrees | φ = 40 degrees | φ = 60 degrees |
|---|---|---|---|---|
| Optical Transmittance (%) | 77.7 | 78 | 76.6 | 63.5 |
| a* | −6.3 | −3.6 | −0.7 | −0.3 |
| b* | 13 | 7.6 | 2.4 | 1.7 |

From Table 3, the CIE Lab colorimetric parameters a*, b* for the reflected light 712 corresponding to the incident light 710 incident at the incident angle φ of about 0 degree (substantially normally incident light 710) may be referred to as first colorimetric parameters a1*, b1*. The colorimetric parameters a*, b* for the reflected light 712 corresponding to the incident light 710 incident at the incident angle φ of about 20 degrees, about 40 degrees, or about 60 degrees may be referred to as second colorimetric parameters a2*, b2*.

Referring to Table 3, for the incident angle φ of about 20 degrees, about 40 degrees, or about 60 degrees, a magnitude of a difference between a1* and a2* was less than about 25. In other words, a magnitude of a difference between the values of the colorimetric parameter a* at substantially normally incidence, and at each of the oblique incident angles of about 20 degrees, about 40 degrees, and about 60 degrees was less than about 25.

Referring to Table 3, for the incident angle φ of about 20 degrees, about 40 degrees, or about 60 degrees, a magnitude of a difference between b1* and b2* was less than about 55. In other words, a magnitude of a difference between the values of the colorimetric parameter b* at substantially normal incidence, and at each of the oblique incident angles of about 20 degrees, about 40 degrees, and about 60 degrees was less than about 55.

Example 4

Table 4 below shows values of the optical transmittance of the optical film 200 having a configuration corresponding to FIG. 6A for the incident light 710, from an illuminant D65, incident at different values of the incident angle φ (shown in FIG. 7). Table 3 further shows CIE Lab colorimetric parameters a*, b* for the reflected light 712 (shown in FIG. 7) corresponding to the incident light 710 incident at different values of the incident angle φ.

Referring to Table 4, the values of the optical transmittance of the optical film 200 were calculated for the incident light 710 incident at the incident angle φ of about 0 degree (i.e., substantially normal incidence), about 20 degrees, about 40 degrees, and about 60 degrees. Further, the CIE Lab colorimetric parameters a*, b* were calculated for the reflected light 712 corresponding to the incident light 710 incident at the incident angle φ of about 0 degree, about 20 degrees, about 40 degrees, and about 60 degrees.

TABLE 4

Results of values of optical transmittance and CIE Lab colorimetric parameters

| | φ = 0 degree | φ = 20 degrees | φ = 40 degrees | φ = 60 degrees |
|---|---|---|---|---|
| Optical Transmittance (%) | 81.2 | 81.3 | 78.8 | 64.8 |
| a* | −1.9 | −1.1 | −0.3 | −0.1 |
| b* | 4.3 | 2.7 | 1.5 | 1.2 |

From Table 4, the CIE Lab colorimetric parameters a*, b* for the reflected light 712 corresponding to the incident light 710 incident at the incident angle φ of about 0 degree (substantially normally incident light 710) may be referred to as first colorimetric parameters a1*, b1*. The colorimetric parameters a*, b* for the reflected light 712 corresponding to the incident light 710 incident at the incident angle φ of about 20 degrees, about 40 degrees, or about 60 degrees may be referred to as second colorimetric parameters a2*, b2*.

Referring to Table 4, for the incident angle φ of about 20 degrees, about 40 degrees, or about 60 degrees, a magnitude of a difference between a1* and a2* was less than about 25. In other words, a magnitude of a difference between the values of the colorimetric parameter a* at substantially normally incidence, and at each of the oblique incident angles of about 20 degrees, about 40 degrees, and about 60 degrees was less than about 25.

Referring to Table 4, for the incident angle φ of about 20 degrees, about 40 degrees, or about 60 degrees, a magnitude of a difference between b1* and b2* was less than about 55. In other words, a magnitude of a difference between the values of the colorimetric parameter b* at substantially normal incidence, and at each of the oblique incident angles of about 20 degrees, about 40 degrees, and about 60 degrees was less than about 55.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A package for protecting a light sensitive material disposed therein, the package comprising an optical film comprising a plurality of polymeric layers numbering at least 20 in total, each of the polymeric layers having an average thickness of less than about 500 nm, such that for a substantially normally incident light, an optical transmittance of the optical film versus wavelength comprises a band edge separating a first wavelength range comprising at least wavelengths from about 360 nm to about 400 nm from a second wavelength range comprising at least wavelengths from about 520 nm to about 680 nm, wherein the optical film has an average optical transmittance of less than about 15% in the first wavelength range and an average optical transmittance of greater than about 70% in the second wavelength range, and wherein, a best linear fit to the band edge correlating the optical transmittance to the wavelength at least across a wavelength range where the optical transmittance along the band edge increases from about 10% to at least about 70% has a slope of greater than about 3%/nm.

2. The package of claim 1, wherein the optical film further comprises at least one skin layer having an average thickness of greater than about 500 nm and disposed at least one of on and between the polymeric layers in the plurality of polymeric layers.

3. The package of claim 1, wherein the optical film has a 50% optical transmittance along the band edge at a wavelength of between about 400 nm and about 530 nm.

4. The package of claim 1, wherein the optical film has a 50% optical transmittance along the band edge at a wavelength of between one of about 400 nm and about 430 nm, about 415 nm and about 445 nm, about 435 nm and about 465 nm, and about 500 nm and about 530 nm.

5. The package of claim 1, wherein the optical film further comprises an optical adhesive layer disposed on the plurality of polymeric layers.

6. The package of claim 1, wherein the optical film further comprises a barrier layer disposed on and having at least one of lower oxygen permeability and water vapor permeability than, the plurality of polymeric layers.

7. The package of claim 1, wherein the optical film further comprises a heat sealable layer disposed on the plurality of polymeric layers for sealing the light sensitive material inside the package when the heat sealable layer is activated by at least one of heat and pressure, the heat sealable layer comprising one or more of ethylene vinyl acetate (EVA), ethylene acrylic acid (EAA), ethylene methyl acrylate (EMA), ethylene methacrylic acid (EMAA), and ethylene ethyl acrylate (EEA).

8. The package of claim 1, wherein for an incident light incident on the optical film from an illuminant D65, the optical film reflects the incident light with a reflected light, in a CIE Lab color space, having a first colorimetric parameter a1* for an incident angle of less than about 5 degrees and a second colorimetric parameter a2* for an incident angle of about 40 degrees, a magnitude of a difference between a1* and a2* is less than about 25.

9. The package of claim 1, wherein for an incident light incident on the optical film from an illuminant D65, the optical film reflects the incident light with a reflected light, in a CIE Lab color space, having a first colorimetric parameter b1* for an incident angle of less than about 5 degrees and a second colorimetric parameter b2* for an incident angle of about 40 degrees, a magnitude of a difference between b1* and b2* is less than about 55.

* * * * *